(12) United States Patent
Shimizu et al.

(10) Patent No.: US 11,073,473 B2
(45) Date of Patent: Jul. 27, 2021

(54) TURBIDITY MEASUREMENT METHOD AND TURBIDIMETER

(71) Applicant: YOKOGAWA ELECTRIC CORPORATION, Tokyo (JP)

(72) Inventors: Hikaru Shimizu, Musashino (JP); Takeshi Kuwagata, Musashino (JP); Megumi Goto, Musashino (JP); Saori Handa, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/794,719

(22) Filed: Feb. 19, 2020

(65) Prior Publication Data
US 2020/0278292 A1    Sep. 3, 2020

(30) Foreign Application Priority Data

Feb. 28, 2019  (JP) .............................. JP2019-036526

(51) Int. Cl.
*G01N 21/51*    (2006.01)
*G01N 21/59*    (2006.01)

(52) U.S. Cl.
CPC .............. *G01N 21/51* (2013.01); *G01N 21/59* (2013.01); *G01N 2201/062* (2013.01); *G01N 2201/121* (2013.01); *G01N 2201/126* (2013.01)

(58) Field of Classification Search
CPC ............. G01N 21/6428; G01N 21/645; G01N 2201/0627; G01N 2021/6419; G01N 21/8507; G01N 33/18; G01N 2021/6421; G01N 2021/6439; G01N 21/01; G01N 2021/6432; G01N 2021/6463; G01N 2201/0221; G01N 1/44; G01N 2035/00544; G01N 35/00989; G01N 2021/7786; G01N 21/77; G01N 21/78; G01N 31/22; G01N 2021/758; G01N 2021/7793; G01N 21/15;
(Continued)

(56) References Cited

U.S. PATENT DOCUMENTS

| 5,140,168 A | * | 8/1992 | King | ..................... G01N 21/532 250/575 |
| 6,894,778 B2 | * | 5/2005 | Palumbo | ................ G01N 21/51 356/338 |

(Continued)

FOREIGN PATENT DOCUMENTS

JP    2006-329629 A    12/2006

*Primary Examiner* — Michael P Stafira
(74) *Attorney, Agent, or Firm* — Rankin, Hill & Clark LLP

(57) ABSTRACT

A turbidity measurement method includes irradiating a first irradiation light L1 having a first spectrum E1, detecting a first measured light ML1 based on the first irradiation light L1, irradiating a second irradiation light L2 having a second spectrum E2 different from the first spectrum E1, detecting a second measured light ML2 based on the second irradiation light L2, calculating turbidity of a liquid to be measured, and correcting at least one of a first parameter related to turbidity calculation associated with the first irradiation light L1 and a second parameter related to turbidity calculation associated with the second irradiation light L2 so that the calculated turbidity of the liquid to be measured corresponds to the turbidity of the liquid to be measured as measured using another light source serving as a standard of comparison.

14 Claims, 9 Drawing Sheets

(58) Field of Classification Search
CPC ............ G01N 21/88; G01N 2201/127; G01N 21/255; G01N 21/31; G01N 15/06; G01N 2015/0693; G01N 21/33; G01N 21/85; G01N 21/274; G01N 21/51; G01N 2035/00346; G01N 2035/1032; G01N 21/6458; G01N 21/65; G01N 35/025; G01N 35/1002; G01N 1/38; G01N 2021/6491; G01N 2035/0443; G01N 2035/0444; G01N 2035/0446; G01N 2035/0455; G01N 21/05; G01N 21/27; G01N 21/35; G01N 21/4133; G01N 21/53; G01N 15/1459; G01N 2015/1006; G01N 2021/0118; G01N 2021/3181; G01N 2021/6417; G01N 2021/6478; G01N 2033/184; G01N 21/3151; G01N 21/359; G01N 21/59; G01N 21/6402; G01N 21/643; G01N 21/6452; G01N 21/6486; G01N 2201/062; G01N 2201/0634; G01N 2201/0691; G01N 2333/70535; G01N 2333/70596; G01N 33/4915; G01N 33/56972; G01N 33/68; G01N 33/6803; G01N 15/1434; G01N 15/1436; G01N 2015/1477; G01N 2015/1486; G01N 2021/3148; G01N 2021/3188; G01N 2021/6482; G01N 2035/00158; G01N 21/0303; G01N 21/278; G01N 21/3103; G01N 21/3563; G01N 21/532; G01N 21/534; G01N 21/55; G01N 21/64; G01N 21/80; G01N 21/82; G01N 21/83; G01N 21/8483; G01N 2201/0212; G01N 2201/0625; G01N 2201/065; G01N 2201/121; G01N 33/1826; G01N 33/188; G01N 33/4833; G01N 33/62; G01N 35/08; G01N 15/1484; G01N 17/00; G01N 1/14; G01N 1/18; G01N 1/2035; G01N 1/28; G01N 1/34; G01N 2001/1006; G01N 2001/205; G01N 2021/0325; G01N 2021/0328; G01N 2021/0346; G01N 2021/052; G01N 2021/3133; G01N 2021/4766; G01N 2021/6441; G01N 2021/8514; G01N 21/03; G01N 21/314; G01N 21/3504; G01N 21/3577; G01N 21/474; G01N 21/4785; G01N 21/648; G01N 21/75; G01N 21/7703; G01N 21/94; G01N 2201/021; G01N 2201/0636; G01N 2201/1211; G01N 27/4166; G01N 27/4167; G01N 27/4168; G01N 2800/26; G01N 31/221; G01N 33/02; G01N 33/025; G01N 33/1813; G01N 33/1886; G01N 33/1893; G01N 33/22; G01N 33/28; G01N 33/2835; G01N 33/2888; G01N 33/2894; G01N 33/493; G01N 33/5091; G01N 33/5302; G01N 33/54373; G01N 33/54386; G01N 33/569; G01N 33/582; G01N 33/6872; G01N 35/00069; G01N 21/658; G01N 21/0332; G01N 33/54313; G01N 2201/08; G01N 2201/129; G01N 33/543; G01N 33/6893; G01N 2021/656; G01N 21/031; G01N 21/251; G01N 21/253; G01N 21/6408; G01N 2201/061; G01N 2201/0612; G01N 2201/0616; G01N 2201/0642; G01N 2201/068; G01N 2201/12; G01N 2201/12753; G01N 2333/916; G01N 2333/924; G01N 33/004; G01N 33/54346; G01N 33/84; G01J 3/28; G01J 3/0218; G01J 3/02; G01J 2003/2866; G01J 3/0262; G01J 3/0291; G01J 3/462; G01J 3/463; G01J 3/18; G01J 3/0224; G01J 3/0272; G01J 3/0264; G01J 3/2823; G01J 3/44; G01J 2003/466; G01J 3/0202; G01J 3/0289; G01J 3/46; G01J 3/465; G01J 3/50; G01J 3/506; G01J 3/51; G01J 3/524; G01J 2003/283; G01J 3/0254; G01J 3/1838; G01J 3/505; G01J 3/0251; G01J 3/0286; G01J 3/10; G01J 3/453; G01J 1/0295; G01J 1/08; G01J 2001/0481; G01J 1/02; G01J 2001/4247; G01J 2003/1213; G01J 3/0229; G01J 3/0256; G01J 3/2803; G01J 1/0271; G01J 1/04; G01J 1/0407; G01J 1/16; G01J 1/44; G01J 2001/061; G01J 2001/083; G01J 2001/086; G01J 2001/4252; G01J 2001/444; G01J 2003/045; G01J 2003/123; G01J 2003/2806; G01J 2003/2876; G01J 2003/4424; G01J 3/0221; G01J 3/024; G01J 3/0259; G01J 3/0297; G01J 3/04; G01J 3/26; G01J 3/42; G01J 3/4531; G01J 3/4532; G01J 3/502; G01J 3/504; G01J 5/0003; G01J 5/0007; G01J 5/0821; G01J 5/60; G01B 11/002; G02B 21/0076; G02B 27/1046; G02B 27/145; G02B 27/149; G02B 27/283; G02B 6/12007

See application file for complete search history.

(56) References Cited

U.S. PATENT DOCUMENTS

| | | | |
|---|---|---|---|
| 2003/0058450 A1* | 3/2003 | Mosley | G01N 21/534 356/436 |
| 2011/0019194 A1* | 1/2011 | Muller | G01N 21/274 356/442 |
| 2011/0043807 A1* | 2/2011 | Andelic | G01N 21/49 356/441 |
| 2011/0273705 A1* | 11/2011 | Rao | G01N 21/6486 356/222 |
| 2012/0224178 A1* | 9/2012 | Carson | A61K 39/00 356/435 |
| 2013/0301051 A1* | 11/2013 | Pogosyan | G01N 21/59 356/432 |
| 2015/0041682 A1* | 2/2015 | Cano | G01N 33/1826 250/459.1 |
| 2015/0316474 A1* | 11/2015 | Phillips | G01N 21/532 210/745 |
| 2016/0054281 A1* | 2/2016 | Smeeton | G01N 21/33 250/373 |
| 2016/0370287 A1* | 12/2016 | Barnes | G01N 1/2035 |
| 2017/0010214 A1* | 1/2017 | Osawa | G01N 21/35 |

* cited by examiner

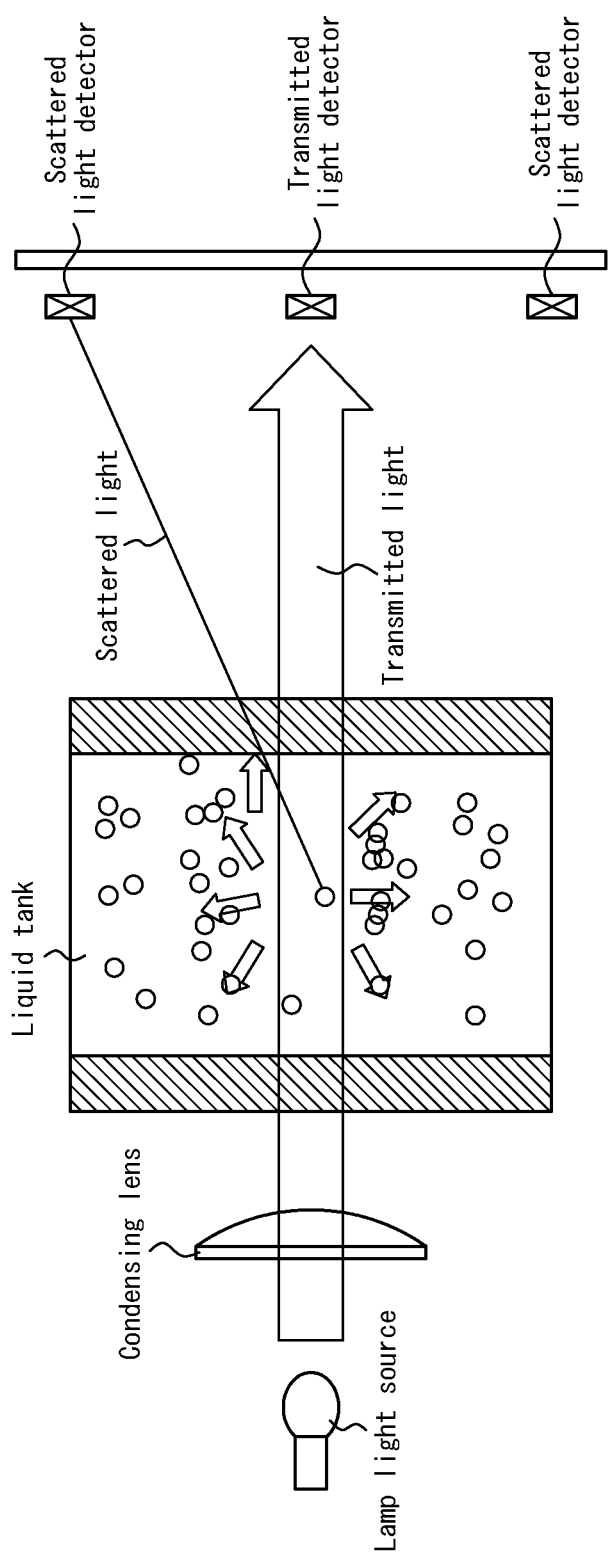

TURBIDITY MEASUREMENT METHOD AND TURBIDIMETER

CROSS-REFERENCE TO RELATED APPLICATION

The present application claims priority to and the benefit of Japanese Patent Application No. 2019-036526 filed Feb. 28, 2019, the entire contents of which are incorporated herein by reference.

TECHNICAL FIELD

The present disclosure relates to a turbidity measurement method and a turbidimeter.

BACKGROUND

Techniques relating to a turbidimeter for measuring the degree of turbidity of a liquid to be measured, such as water, are known.

For example, patent literature (PTL) 1 discloses a turbidimeter capable of accurate measurement by maintaining linearity over a wide range, from areas of low to high concentration of suspended matter in the liquid to be measured, by means of identical cell length and suitable detector arrangement.

CITATION LIST

Patent Literature

PTL 1: JP2006-329629A

SUMMARY

A turbidity measurement method according to an embodiment is for measuring turbidity of a liquid to be measured, the turbidity measurement method including irradiating a first irradiation light having a first spectrum towards the liquid to be measured; acquiring a detection signal of first measured light based on the first irradiation light irradiated towards the liquid to be measured; irradiating a second irradiation light having a second spectrum different from the first spectrum towards the liquid to be measured; acquiring a detection signal of second measured light based on the second irradiation light irradiated towards the liquid to be measured; calculating turbidity of the liquid to be measured based on the detection signal of the first measured light and the detection signal of the second measured light; and correcting at least one of a first parameter related to turbidity calculation associated with the first irradiation light and a second parameter related to turbidity calculation associated with the second irradiation light so that the turbidity calculated in the calculating turbidity of the liquid to be measured corresponds to a turbidity of the liquid to be measured as measured using another light source serving as a standard of comparison.

BRIEF DESCRIPTION OF THE DRAWINGS

In the accompanying drawings:

FIG. 10 schematically illustrates an example cross-section of a known turbidimeter using a lamp light source.

DETAILED DESCRIPTION

Figure 1:
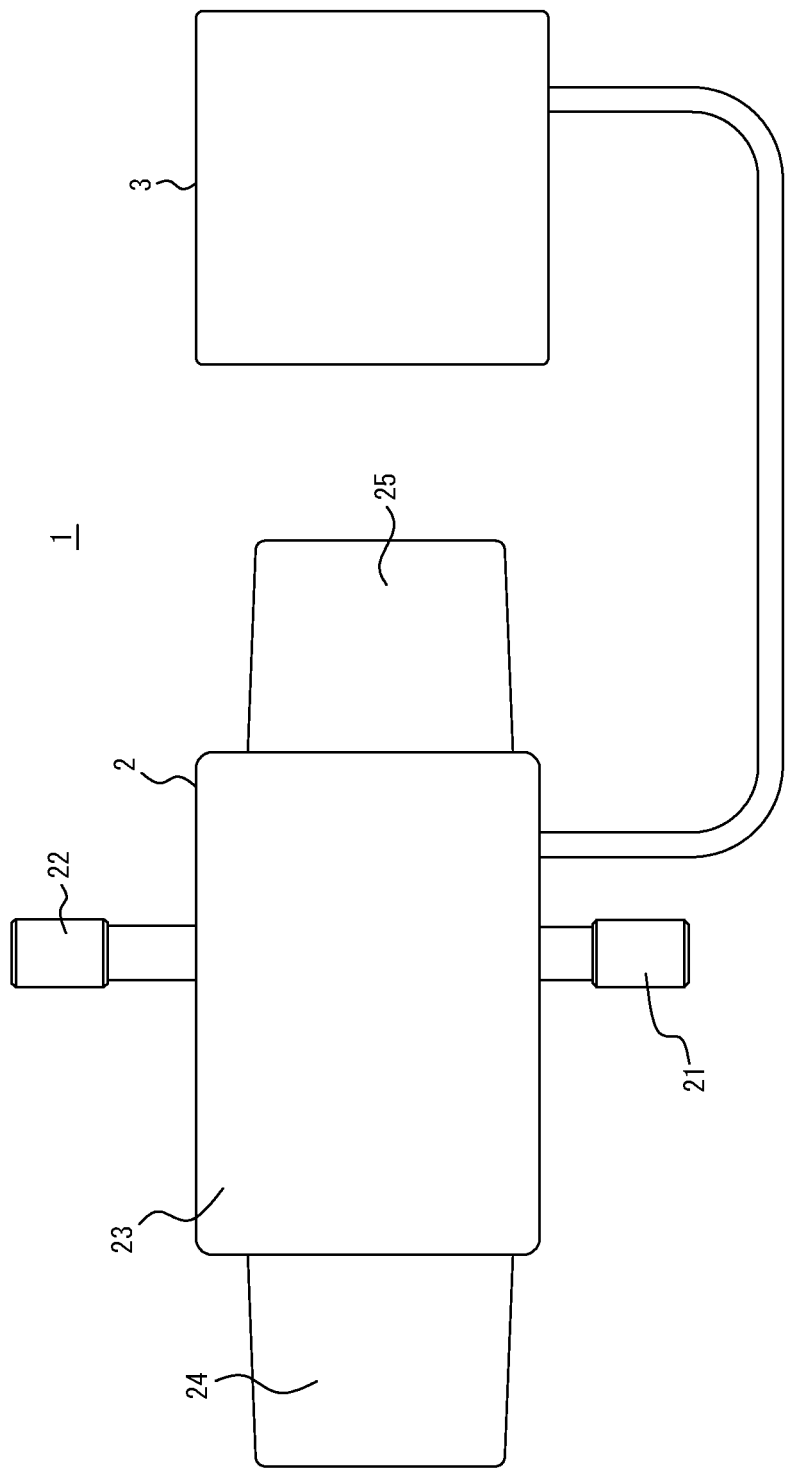
FIG. 1 is a front view illustrating the appearance of a turbidimeter according to an embodiment.

Known turbidimeters tend to use a lamp light source that irradiates white light with a broad emission spectrum, for example, as a light source. If the type of light source from such a known turbidimeter is changed by simply replacing the light source mechanically, the turbidity of a liquid to be measured as measured by the turbidimeter before and after replacement of the light source may not sufficiently correspond.

The present disclosure provides a turbidity measurement method and a turbidimeter capable of calculating the turbidity of a liquid to be measured so as to correspond to the turbidity of the liquid to be measured as measured by a known turbidimeter using another light source.

A turbidity measurement method according to an embodiment is for measuring turbidity of a liquid to be measured, the turbidity measurement method including irradiating a first irradiation light having a first spectrum towards the liquid to be measured; acquiring a detection signal of first measured light based on the first irradiation light irradiated towards the liquid to be measured; irradiating a second irradiation light having a second spectrum different from the first spectrum towards the liquid to be measured; acquiring a detection signal of second measured light based on the second irradiation light irradiated towards the liquid to be measured; calculating turbidity of the liquid to be measured based on the detection signal of the first measured light and the detection signal of the second measured light; and correcting at least one of a first parameter related to turbidity calculation associated with the first irradiation light and a second parameter related to turbidity calculation associated with the second irradiation light so that the turbidity calculated in the calculating turbidity of the liquid to be measured corresponds to a turbidity of the liquid to be measured as measured using another light source serving as a standard of comparison. This turbidity measurement method is capable of calculating the turbidity of a liquid to be measured so as to match the turbidity of the liquid to be measured as measured by a known turbidimeter using another light source. Accordingly, when a user changes a measurement apparatus for turbidity measurement of a liquid to be measured from a known turbidimeter that uses a lamp light source, for example, to the turbidimeter according to an embodiment that uses an LED light source, the user can obtain a similar measurement result for the same liquid to be measured. This is more convenient for the user when updating the measurement apparatus to the turbidimeter according to an embodiment.

In an embodiment, the first parameter related to turbidity calculation may include a first detection signal intensity of the first measured light; the second parameter related to turbidity calculation may include a second detection signal intensity of the second measured light; and in the correcting, at least one of the first detection signal intensity and the second detection signal intensity may be corrected. Consequently, turbidity measurement is performed with detection information, based on the detection signals, having been corrected by signal processing. With this signal processing, the turbidity of the liquid to be measured can therefore be calculated so as to correspond to the turbidity of the liquid to be measured as measured using another light source.

In an embodiment, the irradiating the first irradiation light towards the liquid to be measured and the irradiating the second irradiation light towards the liquid to be measured may be performed at different timings. Consequently, the detection signal of the first measured light and the detection signal of the second measured light can be acquired individually. The contribution of each measured light to the detection signal can therefore be calculated accurately, improving the accuracy related to turbidity calculation.

In an embodiment, the first measured light and the second measured light may each include transmitted light that is transmitted by the liquid to be measured and scattered light that is scattered by the liquid to be measured. A transmitted/scattered light comparison method can therefore be used, allowing the turbidity to be accurately calculated over a wider range than when only one of transmitted light and scattered light is used. Additionally, even if the variation in the drive current due to the surrounding temperature of the turbidimeter or the like differs between the first drive current of the first LED light source that irradiates the first irradiation light and the second drive current of the second LED light source that irradiates the second irradiation light, the effect on turbidity measurement is kept to a minimum by adoption of a transmitted/scattered light comparison method.

In an embodiment, the first detection signal intensity of first scattered light included in the first measured light is designated as $I_{S1}$, the first detection signal intensity of first transmitted light included in the first measured light is designated as $I_{T1}$, the second detection signal intensity of second scattered light included in the second measured light is designated as $I_{S2}$, and the second detection signal intensity of second transmitted light included in the second measured light is designated as $I_{T2}$, and the turbidity N may be calculated as $$N = K\left(\frac{I_{S1} + \alpha I_{S2}}{I_{T1} + \alpha I_{T2}} - \frac{I_{S1(0)} + \alpha I_{S2(0)}}{I_{T1(0)} + \alpha I_{T2(0)}}\right) \quad \text{(Equation 1)}$$

where K is a sensitivity coefficient for turbidity calculation, $I_{S1(0)}$ is the first detection signal intensity of the first scattered light obtained for a liquid with 0 degree turbidity, $I_{T1(0)}$ is the first detection signal intensity of the first transmitted light obtained for a liquid with 0 degree turbidity, $I_{S2(0)}$ is the second detection signal intensity of the second scattered light obtained for a liquid with 0 degree turbidity, $I_{T2(0)}$ is the second detection signal intensity of the second transmitted light obtained for a liquid with 0 degree turbidity, and α is a correction coefficient. The turbidity of the liquid to be measured can thereby be calculated accurately based on the detection signal of the first measured light and the detection signal of the second measured light.

In an embodiment, the first parameter related to turbidity calculation may include a first drive current of a first LED light source that irradiates the first irradiation light; the second parameter related to turbidity calculation may include a second drive current of a second LED light source that irradiates the second irradiation light; and in the correcting, at least one of the first drive current and the second drive current may be corrected. Consequently, turbidity measurement is performed with the emission spectrum having been corrected optically based on the drive current of the LED light source. With this optical processing, the turbidity of the liquid to be measured can therefore be calculated so as to correspond to the turbidity of the liquid to be measured as measured using another light source.

A turbidity measurement method according to an embodiment may further include irradiating a third irradiation light having a third spectrum towards the liquid to be measured; and acquiring a detection signal of third measured light based on the third irradiation light irradiated towards the liquid to be measured. In the calculating turbidity of the liquid to be measured, the turbidity of the liquid to be measured may be calculated based on the detection signal of the first measured light, the detection signal of the second measured light, and the detection signal of the third measured light; and in the correcting, the first parameter related to turbidity calculation associated with the first irradiation light, the second parameter related to turbidity calculation associated with the second irradiation light, and a third parameter related to turbidity calculation associated with the third irradiation light may be corrected. Consequently, even when the turbidity of the liquid to be measured is measured using three light sources, the turbidity of a liquid to be measured can be calculated so as to match the turbidity of the liquid to be measured as measured by a known turbidimeter using another light source. Accordingly, when a user changes a measurement apparatus for turbidity measurement of a liquid to be measured from a known turbidimeter that uses a lamp light source, for example, to the turbidimeter according to an embodiment that uses an LED light source, the user can obtain a similar measurement result for the same liquid to be measured. This is more convenient for a user when updating the measurement apparatus to the turbidimeter according to an embodiment.

A turbidimeter according to an embodiment is for measuring turbidity of a liquid to be measured, the turbidimeter including: a first light source configured to irradiate a first irradiation light having a first spectrum towards the liquid to be measured; a second light source configured to irradiate a second irradiation light having a second spectrum different from the first spectrum towards the liquid to be measured; a light receiver configured to acquire a detection signal of first measured light based on the first irradiation light irradiated towards the liquid to be measured and a detection signal of second measured light based on the second irradiation light irradiated towards the liquid to be measured; and a controller configured to calculate turbidity of the liquid to be measured based on the detection signal of the first measured light and the detection signal of the second measured light. The controller is configured to correct at least one of a first parameter related to turbidity calculation associated with the first irradiation light and a second parameter related to turbidity calculation associated with the second irradiation light so that the turbidity calculated by the controller corresponds to a turbidity of the liquid to be measured as measured using another light source serving as a standard of comparison. This turbidimeter is capable of calculating the turbidity of a liquid to be measured so as to match the turbidity of the liquid to be measured as measured by a known turbidimeter using another light source. Accordingly, when a user changes a measurement apparatus for turbidity measurement of a liquid to be measured from a known turbidimeter that uses a lamp light source, for example, to the turbidimeter according to an embodiment that uses an LED light source, the user can obtain a similar measurement result for the same liquid to be measured. This is more convenient for a user when updating the measurement apparatus to the turbidimeter according to an embodiment.

In an embodiment, the first parameter related to turbidity calculation may include a first detection signal intensity of the first measured light detected by the light detector; the second parameter related to turbidity calculation may include a second detection signal intensity of the second measured light detected by the light detector; and the controller may be configured to correct at least one of the first detection signal intensity and the second detection signal intensity. Consequently, the turbidimeter performs turbidity measurement with detection information, based on the detection signals calculated by the detector, having been corrected by signal processing. With this signal processing, the controller can therefore calculate the turbidity of the liquid to be measured so as to correspond to the turbidity of the liquid to be measured as measured using another light source.

In an embodiment, the controller may be configured to operate the first light source and the second light source at different timings to irradiate the first irradiation light and the second irradiation light at different timings. Consequently, the controller can acquire the detection signal of the first measured light and the detection signal of the second measured light individually. The controller can thereby calculate the contribution of each measured light to the detection signal accurately, improving the accuracy related to turbidity calculation.

In an embodiment, the first measured light and the second measured light may each include transmitted light that is transmitted by the liquid to be measured and scattered light that is scattered by the liquid to be measured. The controller can therefore use a transmitted/scattered light comparison method and calculate the turbidity accurately over a wider range than when only one of transmitted light and scattered light is used. Additionally, even if the variation in the drive current due to the surrounding temperature of the turbidimeter or the like differs between the first drive current of the first LED light source that irradiates the first irradiation light and the second drive current of the second LED light source that irradiates the second irradiation light, the effect on turbidity measurement is kept to a minimum by adoption of a transmitted/scattered light comparison method.

In an embodiment, the first detection signal intensity of first scattered light included in the first measured light is designated as $I_{S1}$, the first detection signal intensity of first transmitted light included in the first measured light is designated as $I_{T1}$, the second detection signal intensity of second scattered light included in the second measured light is designated as $I_{S2}$, and the second detection signal intensity of second transmitted light included in the second measured light is designated as $I_{T2}$, and the controller may be configured to calculate the turbidity N as $$N = K\left(\frac{I_{S1} + \alpha I_{S2}}{I_{T1} + \alpha I_{T2}} - \frac{I_{S1(0)} + \alpha I_{S2(0)}}{I_{T1(0)} + \alpha I_{T2(0)}}\right) \quad \text{(Equation 2)}$$

where K is a sensitivity coefficient for turbidity calculation, $I_{S1(0)}$ is the first detection signal intensity of the first scattered light obtained for a liquid with 0 degree turbidity, $I_{T1(0)}$ is the first detection signal intensity of the first transmitted light obtained for a liquid with 0 degree turbidity, $I_{S2(0)}$ is the second detection signal intensity of the second scattered light obtained for a liquid with 0 degree turbidity, $I_{T2(0)}$ is the second detection signal intensity of the second transmitted light obtained for a liquid with 0 degree turbidity, and at is a correction coefficient. The turbidity of the liquid to be measured can thereby be calculated accurately based on the detection signal of the first measured light and the detection signal of the second measured light.

In an embodiment, the first light source may include a first LED light source; the second light source may include a second LED light source; the first parameter related to turbidity calculation may include a first drive current of the first LED light source; the second parameter related to turbidity calculation may include a second drive current of the second LED light source; and the controller may be configured to correct at least one of the first drive current and the second drive current. Consequently, the turbidimeter performs turbidity measurement with the emission spectrum having been corrected optically based on the drive current of the LED light source. With this optical processing, the controller can therefore calculate the turbidity of the liquid to be measured so as to correspond to the turbidity of the liquid to be measured as measured using another light source.

A turbidimeter according to an embodiment may further include a third light source configured to irradiate a third irradiation light having a third spectrum towards the liquid to be measured. The light receiver may be configured to acquire a detection signal of third measured light based on the third irradiation light irradiated towards the liquid to be measured; the controller may be configured to correct the first parameter related to turbidity calculation associated with the first irradiation light, the second parameter related to turbidity calculation associated with the second irradiation light, and a third parameter related to turbidity calculation associated with the third irradiation light; and the controller may be configured to calculate the turbidity of the liquid to be measured based on the detection signal of the first measured light, the detection signal of the second measured light, and the detection signal of the third measured light. Consequently, even when the turbidity of the liquid to be measured is measured using three light sources, the turbidity of a liquid to be measured can be calculated so as to match the turbidity of the liquid to be measured as measured by a known turbidimeter using another light source. Accordingly, when a user changes a measurement apparatus for turbidity measurement of a liquid to be measured from a known turbidimeter that uses a lamp light source, for example, to the turbidimeter according to an embodiment that uses an LED light source, the user can obtain a similar measurement result for the same liquid to be measured. This is more convenient for the user when updating the measurement apparatus to the turbidimeter according to an embodiment.

The present disclosure can provide a turbidity measurement method and a turbidimeter capable of calculating the turbidity of a liquid to be measured so as to match the turbidity of the liquid to be measured as measured by a known turbidimeter using another light source.

The turbidity of a liquid to be measured as measured by a turbidimeter is determined by the number of particles, i.e. amount of suspended matter, present in the liquid to be measured. Various methods are known for measuring the amount of suspended matter. For example, the absorption and scattering of irradiation light by suspended matter in the liquid to be measured are used in a turbidimeter based on a transmitted/scattered light comparison method. When irradiated light is irradiated onto liquid to be measured that includes suspended matter, the transmitted light is absorbed by particles and weakens as the turbidity is higher. The scattered light, on the other hand, is scattered by particles and strengthens as the turbidity is higher.

The intensity of transmitted light changes logarithmically by the Beer-Lambert law and becomes extremely weak in a highly turbid liquid. Accordingly, it is difficult to measure a highly turbid liquid to be measured using only transmitted light. Scattered light is theoretically proportional to turbidity, but during actual measurement, scattered light is affected by absorption in a highly turbid liquid to be measured. Consequently, the detection signal intensity related to the scattered light is not proportional to turbidity. A turbidimeter based on a transmitted/scattered light comparison method therefore uses the value yielded by dividing the detection signal intensity of scattered light by the detection signal intensity of transmitted light, and a monotonically increasing function between the detection signal value and the turbidity is established.

As illustrated in FIG. 10, for example, a known turbidimeter includes a lamp light source, a condensing lens, a liquid tank, a transmitted light detector for detecting transmitted light, and scattered light detectors for detecting scattered light. White light irradiated from the lamp light source is changed into parallel light by the condensing lens. The parallel white light is then incident on the liquid tank. The edges of the liquid tank are partitioned by transparent glass. For example, a portion of the parallel light is scattered by suspended matter in the liquid to be measured flowing in the liquid tank from the bottom to the top in FIG. 10. The scattered light is detected by a scattered light detector positioned downstream from the liquid tank. The transmitted light that is not scattered but rather transmitted is detected by a transmitted light detector similarly positioned downstream from the liquid tank. A turbidity N of the liquid to be measured is calculated with Equation 3 below by an arithmetic circuit or the like, using the detection signal intensities of the detected transmitted light and the detected scattered light.

$$\frac{I_S}{I_T} = \frac{I_S(0)}{I_T(0)} + cLN \qquad \text{(Equation 3)}$$

In Equation 3, $I_T$ represents the detection signal intensity of transmitted light transmitted by the liquid to be measured, and $I_S$ represents the detection signal intensity of scattered light scattered by the liquid to be measured. $I_T(0)$ represents the detection signal intensity of transmitted light transmitted by a liquid with 0 degree turbidity, and $I_S(0)$ represents the detection signal intensity of scattered light scattered by a liquid with 0 degree turbidity. Furthermore, c is a constant determined by the suspended matter in the liquid to be measured and the shape and characteristics of the detectors, and L is the optical path length of the liquid tank used for measurement. As illustrated in Equation 3, the ratio $I_S/I_T$ changes linearly with respect to the turbidity N.

As a light source, known turbidimeters tend to use a lamp light source that irradiates white light with a broad emission spectrum, for example. The drawback of a lamp light source is that the filament easily breaks, resulting in a short lifespan. Moreover, a lamp light source has the disadvantage of condensation easily forming on the transparent glass of the liquid tank due to heat being generated by large power consumption. Condensation on the transparent glass of the liquid tank can cause further scattering of light, which might reduce accuracy when measuring the turbidity of the liquid to be measured.

A light-emitting diode (LED) light source, for example, is sometimes used as a light source to resolve the aforementioned problems. A monochromatic LED is a known example of an LED used as a light source in a turbidimeter. The spectrum of irradiation light from such a monochromatic LED light source has a half width of several nm to several tens of nm in the visible region or in the near-infrared region of 1000 nm or less, for example. The near-infrared region refers to a predetermined wavelength region at longer wavelengths than the visible region and includes a wavelength region relatively near the visible region within the infrared region described below. For example, the near-infrared region includes a wavelength region of 780 nm to 2000 nm. The wavelength band and spectral intensity of the emission spectrum of such a monochromatic LED light source differ greatly from a known lamp light source. For example, the spectrum of irradiation light from a lamp light source has a peak in the infrared region, and the wavelength band thereof extends to the entire visible region, unlike a monochromatic LED light source. Here, the infrared region refers to a predetermined wavelength region at longer wavelengths than the visible region and includes a predetermined wavelength region having a wavelength greater than 780 nm, for example.

Another example of a known LED used as a light source of a turbidimeter is a white LED or a dimmable/mixed color LED that uses phosphor or the like and whose irradiation light appears close to natural sunlight, fluorescent light, the light of a lamp light source, or the like. The irradiation light of these LED light sources appears to the human eye to be similar to irradiation light from a lamp light source. The emission spectrum of these LED light sources, however, has a plurality of discontinuous peaks in the visible region. This differs greatly from the emission spectrum of a lamp light source, in which the spectral intensity changes continuously in the visible region.

The aforementioned known LED light sources are highly versatile but differ greatly from a lamp light source with regard to wavelength characteristics. Accordingly, replacing a lamp light source with a known LED light source during turbidity measurement of a liquid to be measured might reduce the compatibility of the detection sensitivity of turbidity. In other words, the turbidity measured by a turbidimeter having a lamp light source and the turbidity measured by a turbidimeter having an LED light source might not match for liquids to be measured other than a reference liquid. The reason is that if the wavelength characteristics of the light source in use differ, then the scattering angle distribution also differs, and the absorption characteristics of the suspended matter included in the liquid to be measured, or of the liquid to be measured itself, differ. The detected scattered light intensity and transmitted light intensity might therefore change. The reference liquid refers to a liquid that includes a predetermined turbidity reference material regulated by a predetermined turbidity standard and that has a known turbidity.

In light of the aforementioned problems, the present disclosure provides a turbidity measurement method and a turbidimeter capable of calculating the turbidity of a liquid to be measured using an LED light source so as to correspond to the turbidity of the liquid to be measured as measured by a known turbidimeter using another light source, specifically a lamp light source.

Embodiments of the present disclosure are mainly described below with reference to the drawings.

FIG. 1 is a front view illustrating the appearance of a turbidimeter 1 according to an embodiment.

The turbidimeter 1 according to an embodiment is, for example, a turbidimeter based on a transmitted/scattered light comparison method. The turbidimeter 1 measures the turbidity of a liquid to be measured. The major constituent elements of the turbidimeter 1 include an optical apparatus 2 and a processing apparatus 3. The optical apparatus 2 irradiates irradiation light towards a liquid to be measured that passes through the optical apparatus 2 and detects transmitted light T and scattered light S based on the irradiation light. The processing apparatus 3 is connected to the optical apparatus 2 and acquires a detection signal from the optical apparatus 2 based on the transmitted light T and scattered light S detected by the optical apparatus 2. The processing apparatus 3 executes processes such as calculation of the turbidity of the liquid to be measured based on the detection signal acquired from the optical apparatus 2. The processing apparatus 3 also controls the optical apparatus 2.

The optical apparatus 2 includes a liquid-to-be-measured inlet 21 into which the liquid to be measured flows from below in FIG. 1 and a liquid-to-be-measured outlet 22 from which the liquid to be measured that flowed into the optical apparatus 2 through the liquid-to-be-measured inlet 21 flows out. The optical apparatus 2 includes a body 23, a light source 24, and a light receiver 25. A liquid tank, which guides the liquid to be measured flowing from below to above, is included inside the body 23. The liquid tank of the body 23 is enclosed between the light source 24 and the light receiver 25 in a direction intersecting the direction in which the liquid to be measured flows.

Figure 2:
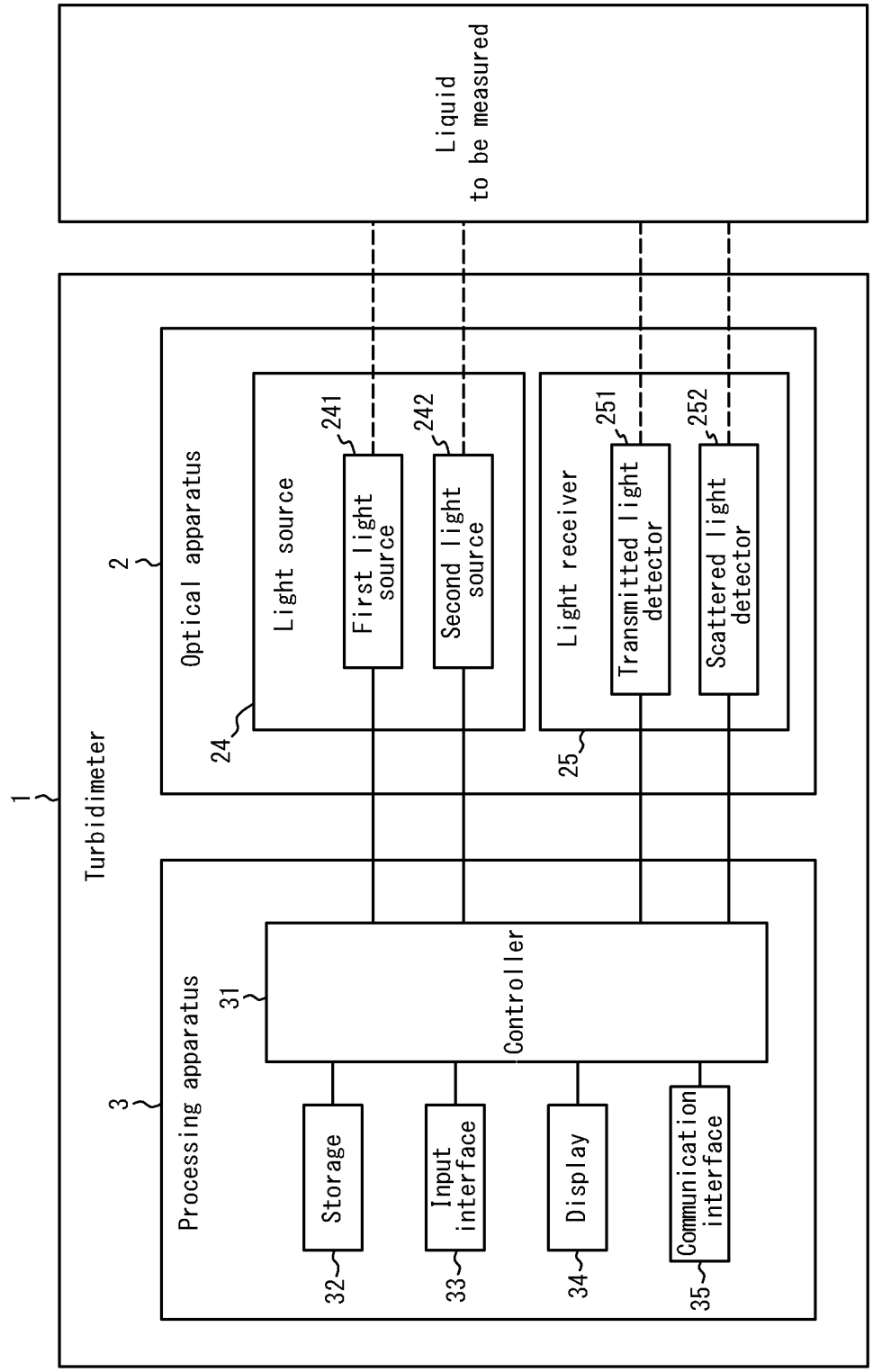
FIG. 2 is a block diagram illustrating an example configuration of the turbidimeter in FIG. 1.

FIG. 2 is a block diagram illustrating an example configuration of the turbidimeter 1 in FIG. 1.

The light source 24 included in the optical apparatus 2 includes a first light source 241 and a second light source 242.

The first light source 241 irradiates first irradiation light L1, which has a below-described first spectrum E1, towards the liquid to be measured.

The first light source 241 includes any light source capable of irradiating the first irradiation light L1. For example, the first light source 241 includes a first LED light source D1.

The second light source 242 irradiates second irradiation light L2, which has a below-described second spectrum E2 different from the first spectrum E1, towards the liquid to be measured. The second light source 242 includes any light source capable of irradiating the second irradiation light L2. For example, the second light source 242 includes a second LED light source D2.

The light receiver 25 included in the optical apparatus 2 acquires a detection signal of first measured light ML1 based on the first irradiation light L1 irradiated towards the liquid to be measured and a detection signal of second measured light ML2 based on the second irradiation light L2 irradiated towards the liquid to be measured. The light receiver 25 outputs a detection current or a detection voltage as the detection signal of the first measured light ML1 and the second measured light ML2. The intensity of the outputted detection signal corresponds to the optical intensity of the measured light detected by the light receiver 25. When the turbidimeter 1 is based on a transmitted/scattered light comparison method, the first measured light ML1 includes first transmitted light T1 transmitted by the liquid to be measured and first scattered light S1 scattered by the liquid to be measured. Similarly, the second measured light ML2 includes second transmitted light T2 transmitted by the liquid to be measured and second scattered light S2 scattered by the liquid to be measured.

The light receiver 25 includes a transmitted light detector 251 and scattered light detectors 252.

The transmitted light detector 251 detects first transmitted light T1 based on the first irradiation light L1 and second transmitted light T2 based on the second irradiation light L2. The transmitted light detector 251 includes any light detector capable of detecting the first transmitted light T1 and the second transmitted light T2. For example, the transmitted light detector 251 includes a photodiode. The wavelength band of the photodiode included in the transmitted light detector 251 includes the wavelength band of the optical spectrum of the first transmitted light T1 and the second transmitted light T2.

The scattered light detector 252 detects first scattered light S1 based on the first irradiation light L1 and second scattered light S2 based on the second irradiation light L2. The scattered light detector 252 includes any light detector capable of detecting the first scattered light S1 and the second scattered light S2. For example, the scattered light detector 252 includes a photodiode. The wavelength band of the photodiode included in the scattered light detector 252 includes the wavelength band of the optical spectrum of the first scattered light S1 and the second scattered light S2.

The processing apparatus 60 includes a controller 31, a storage 32, an input interface 33, a display 34, and a communication interface 35.

The controller 31 includes one or more processors. For example, the controller 31 includes a processor capable of processing related to the turbidimeter 1. The controller 31 is connected to each component configuring the turbidimeter 1 and controls and manages the turbidimeter 1 overall, starting with the components thereof. For example, the controller 31 controls the drive current of the LED light source included in each of the first light source 241 and the second light source 242. The controller 31 also, for example, calculates the turbidity of the liquid to be measured based on the detection signal of the first measured light ML1 and the second measured light ML2 outputted from the optical apparatus 2. Additionally, the controller 31 calculates parameters necessary for calculating the turbidity of the liquid to be measured, for example.

The storage 32 includes any storage apparatus, such as a hard disk drive (HDD), a solid state drive (SSD), an electrically erasable programmable read-only memory (EEPROM), a read-only memory (ROM), and a random access memory (RAM), and stores information necessary for implementing operations of the turbidimeter 1. The storage 32 may function as a main storage apparatus, an auxiliary storage apparatus, or a cache memory. The storage 32 is not limited to being internal to the turbidimeter 1 and may be an external storage apparatus connected through a digital input/output port or the like, such as USB. The storage 32 stores various information calculated by the controller 31, for example. For example, the storage 32 stores detection information based on the detection signals of the first measured light ML1 and the second measured light ML2 outputted from the optical apparatus 2.

The input interface 33 includes any input interface that receives input operations by the user of the turbidimeter 1. The input interface 33 receives input operations by the user of the turbidimeter 1 to acquire input information from the user. The input interface 33 outputs the acquired input information to the controller 31. For example, the user uses the input interface 33 to input any information necessary for implementing the operations of the turbidimeter 1.

The display 34 includes any output interface that outputs images. The display 34 includes a liquid crystal display, for example. The display 34 displays various information calculated by the controller 31, for example, to the user of the turbidimeter 1. For example, the display 34 displays settings screens, necessary for the user to input any type of information for implementing the operations of the turbidimeter 1, to the user.

The communication interface 35 includes any communication interface corresponding to a suitable wired or wireless communication protocol. The communication interface 35 may transmit various information calculated by the controller 31 to any external apparatus. The communication interface 35 may receive any information necessary for implementing operations of the turbidimeter 1 from any external apparatus. For example, the communication interface 35 may receive a control signal for controlling the optical apparatus 2 from any external apparatus.

Figure 3:
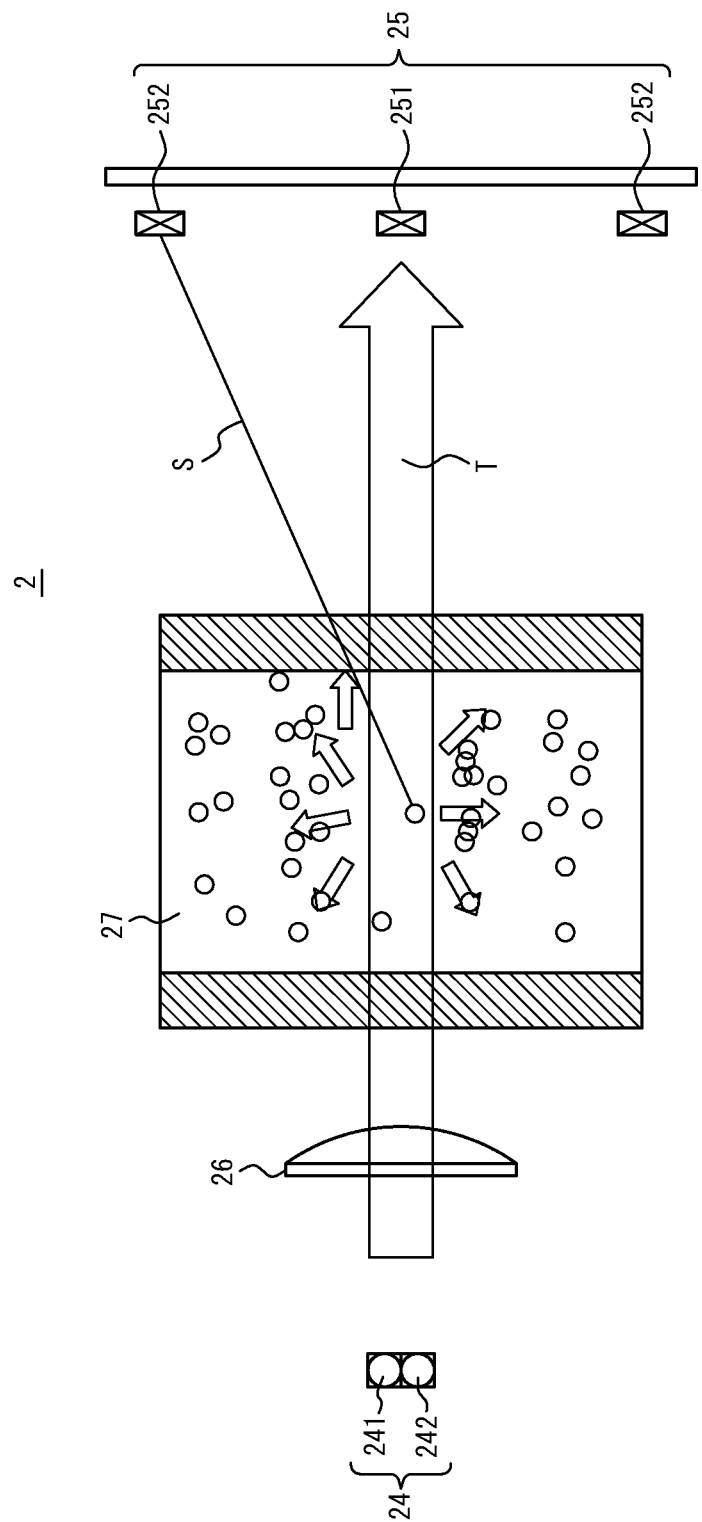
FIG. 3 schematically illustrates an example cross-section of the optical apparatus in FIG. 1.

FIG. 3 schematically illustrates an example cross-section of the optical apparatus 2 in FIG. 1. With reference to FIG. 3, operations related to the optical system of the turbidimeter 1 are mainly described below.

The irradiation light irradiated by the light source 24, which includes the first light source 241 and the second light source 242, is converted into parallel light by a condensing lens 26. The parallel irradiation light is then incident on a liquid tank 27. The edges of the liquid tank 27 are partitioned by transparent glass. The liquid to be measured flows in the liquid tank 27 from the bottom to the top of the diagram, for example. The light receiver 25 is disposed on the opposite side of the liquid tank 27 from the light source 24.

Transmitted light T transmitted through the liquid to be measured in the liquid tank 27 is detected by the transmitted light detector 251 disposed on the opposite side of the liquid tank 27 facing the light source 24, for example.

Among scattered light S scattered by suspended matter in the liquid to be measured flowing in the liquid tank 27, scattered light S having a predetermined angle relative to the transmitted light T, which is a parallel light beam, is detected by the scattered light detectors 252 disposed above and below the transmitted light detector 251, for example. The number of light detectors constituting the scattered light detectors 252 is not limited to two. One light detector, or three or more, may be used. The controller 31 calculates the turbidity N by calculating the ratio $I_S/I_T$ based on a detection signal intensity $I_T$ of the transmitted light T detected by the light receiver 25 and a detection signal intensity $I_S$ of the scattered light S detected by the light receiver 25.

Figure 4:
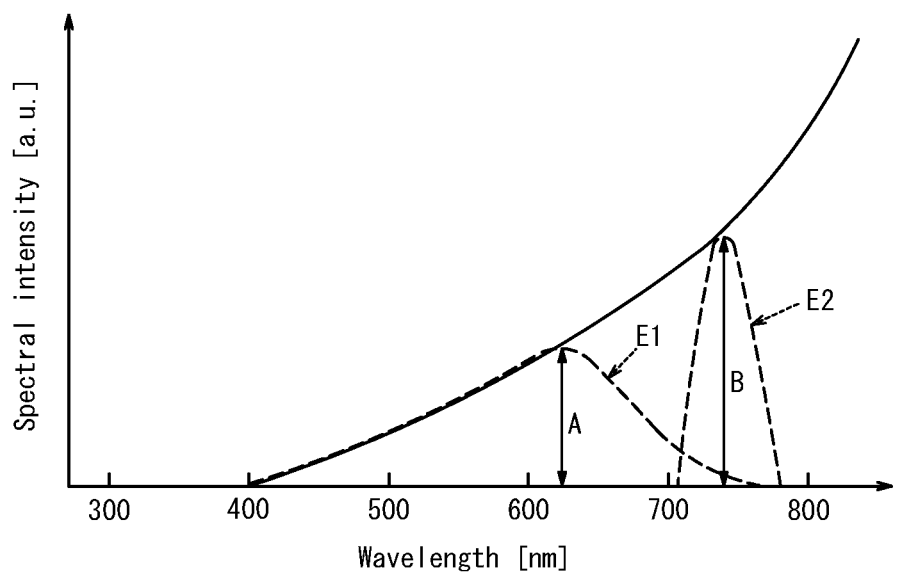
FIG. 4 schematically illustrates an example of the spectrum of irradiation light irradiated by each light source.

FIG. 4 schematically illustrates an example of the spectrum of irradiation light irradiated by each light source. With reference to FIG. 4, the emission spectra of a known lamp light source, the first LED light source D1 included in the first light source 241, and the second LED light source D2 included in the second light source 242 are now compared and described.

In FIG. 4, the emission spectrum of a known lamp light source is indicated by a solid line. In the emission spectrum of a known lamp light source in FIG. 4, the emission spectrum at longer wavelengths than a wavelength near 800 nm, including a peak appearing in the infrared region, is not illustrated. In other words, the emission spectrum of a known lamp light source is only illustrated in FIG. 4 for shorter wavelengths than a wavelength near 800 nm. In FIG. 4, the first spectrum E1 of the first irradiation light L1 of the first LED light source D1 and the second spectrum E2 of the second irradiation light L2 of the second LED light source D2 are indicated by dashed lines.

In the turbidimeter 1 according to an embodiment, wavelength characteristics similar to the wavelength characteristics of a known lamp light source are achieved based on the first spectrum E1 of the first irradiation light L1 and the second spectrum E2 of the second irradiation light L2.

In greater detail, the first spectrum E1 of the first irradiation light L1 irradiated by the first LED light source D1 sufficiently corresponds to the emission spectrum of a lamp light source in the visible region. In other words, the first spectrum E1 rises near a wavelength of 400 nm and extends across roughly the entire visible region, like the emission spectrum of a lamp light source. The first LED light source D1 thus has similar wavelength characteristics to the wavelength characteristics of a lamp light source in the visible region. In the near-infrared region of 780 nm or greater, however, the spectral intensity of the first spectrum E1 decreases, and the first LED light source D1 exhibits wavelength characteristics differing from the wavelength characteristics of a lamp light source.

The second LED light source D2 compensates for the decrease in spectral intensity of the first LED light source D1 in the near-infrared region so that the spectral intensity of the light source 24 in this region corresponds to the spectral intensity of a lamp light source. In other words, the second spectrum E2 has a peak corresponding to the spectral intensity of a lamp light source in the near-infrared region and extends with a predetermined half width. The emission spectrum of a known lamp light source also has a predetermined spectral intensity at longer wavelengths than the region over which the second spectrum E2 extends. However, a light detector having sensitivity at a predetermined wavelength or less in the near-infrared region, for example, has conventionally been used. The use of a similar light detector in the light receiver 25 makes it possible to ignore the effect on turbidity measurement of the emission spectrum of a lamp light source at longer wavelengths than this predetermined wavelength.

To irradiate the first irradiation light L1 having the first spectrum E1 illustrated in FIG. 4, the first LED light source D1 includes phosphor and an additional excitation LED for exciting the phosphor. The peak of the emission spectrum of the excitation LED appears in the ultraviolet region, for example. Here, the ultraviolet region refers to a predetermined wavelength region at shorter wavelengths than the visible region and includes a predetermined wavelength region having a wavelength less than 380 nm, for example. The spectral intensity of a known lamp light source, on the other hand, is substantially zero in the ultraviolet region. In the turbidimeter 1 according to an embodiment, the peak in this ultraviolet region is sometimes suppressed to achieve similar wavelength characteristics to the wavelength characteristics of a known lamp light source. Accordingly, the first LED light source D1 may include a suitable optical filter that is disposed on the optical path of the excitation LED and suppresses the peak of the excitation LED.

In addition to or instead of an optical filter for suppressing the peak in the ultraviolet region, the first LED light source D1 may include a plurality of monochromatic LEDs with different emission wavelengths within the wavelength region over which the first spectrum E1 extends. This additional spectral intensity resulting from the plurality of monochromatic LEDs makes the spectral intensity of the first spectrum E1 extending over the visible region sufficiently large as compared to the spectral intensity of the excitation LED in the ultraviolet region. The peak of the excitation LED in the ultraviolet region therefore decreases relative to the first spectrum E1. Consequently, the peak of the excitation LED in the ultraviolet region is relatively suppressed.

In addition to or instead of the aforementioned structure for suppressing the peak in the ultraviolet region, the first LED light source D1 may include a structure related to a phosphor that increases the excitation efficiency, i.e. the energy efficiency, of the excitation LED. In greater detail, the first LED light source D1 may include a phosphor that is at least one of an optimal type and an optimal optical density. The phosphor of the first LED light source D1 may, for example, be selected as a type of phosphor that has a somewhat smaller half width than the first spectrum E1 illustrated in FIG. 4 but that sufficiently reduces the peak of the excitation LED. The phosphor of the first LED light source D1 may, for example, be selected as a phosphor having an optical density such that excitation light from the excitation LED is sufficiently absorbed within the phosphor. When the first LED light source D1 thus includes a phosphor that achieves increased energy efficiency, the peak of the excitation LED in the ultraviolet region decreases relative to the first spectrum E1. The excitation LED can also emit light in the visible region instead of the ultraviolet region. A suitable optical filter for suppressing the peak of the excitation LED can therefore be omitted.

To irradiate the second irradiation light L2 having the second spectrum E2 illustrated in FIG. 4, the second LED light source D2 includes a monochromatic LED that emits light in the near-infrared region. The configuration for increasing the emission intensity from the light source 24 in the near-infrared region is not limited to this example. In addition to or instead of the monochromatic LED included in the second LED light source D2, the light source 24 may include an additional phosphor in the first LED light source D1. This additional phosphor increases the emission intensity in the near-infrared region. When the light source 24 includes such a phosphor instead of the monochromatic LED of the second LED light source D2, the first light source 241 and the second light source 242 are configured to share the same phosphor.

For example, when the first LED light source D1 and the second LED light source D2 use different LEDs, as described above, the intensity of irradiation light normally differs for each LED. This difference between the first LED light source D1 and the second LED light source D2 therefore needs to be taken into consideration during turbidity measurement.

The controller 31 therefore corrects at least one of the first parameter related to turbidity calculation associated with the first irradiation light L1 and the second parameter related to turbidity calculation associated with the second irradiation light L2 so that, even when the above-described light source 24 is used, the turbidity calculated by the controller 31 corresponds to the turbidity of the liquid to be measured as measured using another light source serving as a standard of comparison, i.e. a lamp light source. Two examples of such a correction method are described below.

In the first example correction method, the first parameter related to turbidity calculation includes the first detection signal intensity of the first measured light ML1 detected by the light receiver 25, and the second parameter related to turbidity calculation includes the second detection signal intensity of the second measured light ML2 detected by the light receiver 25. At this time, the controller 31 corrects at least one of the first detection signal intensity and the second detection signal intensity so that the turbidity calculated by the controller 31 corresponds to the turbidity of the liquid to be measured as measured using a lamp light source. In this first example correction method, the turbidimeter 1 may, for example, perform turbidity measurement with detection information, based on the detection signals detected by the light receiver 25, that has been corrected by signal processing.

To execute such signal processing, the controller 31 in the first example correction method operates the first LED light source D1 and the second LED light source D2 at different timings to irradiate the first irradiation light L1 and the second irradiation light L2 at different timings. For example, the controller 31 operates the first LED light source D1 and the second LED light source D2 alternately to irradiate the first irradiation light L1 and the second irradiation light L2 alternately. The first detection signal intensity of the first scattered light S1 is designated as $I_{S1}$, and the first detection signal intensity of the first transmitted light T1 is designated as $I_{T1}$, where $I_{S1}$ and $I_{T1}$ are obtained when only the first LED light source D1 emits light towards the liquid to be measured. The second detection signal intensity of the second scattered light S2 is designated as $I_{S2}$, and the second detection signal intensity of the second transmitted light T2 is designated as $I_{T2}$, where $I_{S2}$ and $I_{T2}$ are obtained when only the second LED light source D2 emits light towards the liquid to be measured. At this time, the controller 31 calculates the turbidity N using Equation 4 below.

$$N = K\left(\frac{I_{S1} + \alpha I_{S2}}{I_{T1} + \alpha I_{T2}} - \frac{I_{S1(0)} + \alpha I_{S2(0)}}{I_{T1(0)} + \alpha I_{T2(0)}}\right) \quad \text{(Equation 4)}$$

In Equation 4, K is a sensitivity coefficient for turbidity calculation and indicates the slope when the first measured light ML1 and the second measured light ML2 are measured at two known turbidities N using a liquid with 0 degree turbidity and a reference liquid. The sensitivity coefficient is a factor of proportionality for converting the ratio $I_S/I_T$ to the turbidity N. When measurement is performed on each of the liquid with 0 degree turbidity and the reference liquid, each detection signal intensity in Equation 4 can actually be measured. The sensitivity coefficient K can be calculated based on a known turbidity N and the below-described correction coefficient $\alpha$ along with each actually measured detection signal intensity.

$I_{S1(0)}$ indicates the first detection signal intensity of the first scattered light S1 obtained when only the first LED light source D1 emits light towards a liquid with 0 degree turbidity. $I_{T1(0)}$ indicates the first detection signal intensity of the first transmitted light T1 obtained when only the first LED light source D1 emits light towards a liquid with 0 degree turbidity. $I_{S2(0)}$ indicates the second detection signal intensity of the second scattered light S2 obtained when only the second LED light source D2 emits light towards a liquid with 0 degree turbidity. $I_{T2(0)}$ indicates the second detection signal intensity of the second transmitted light T2 obtained when only the second LED light source D2 emits light towards a liquid with 0 degree turbidity.

Furthermore, α is a correction coefficient for bringing the rate at which the first LED light source D1 and the second LED light source D2 contribute to turbidity measurement closer to a known lamp light source. In greater detail, the correction coefficient α is calculated by the following procedure for each pair of the first LED light source D1 and the second LED light source D2.

Figure 5:
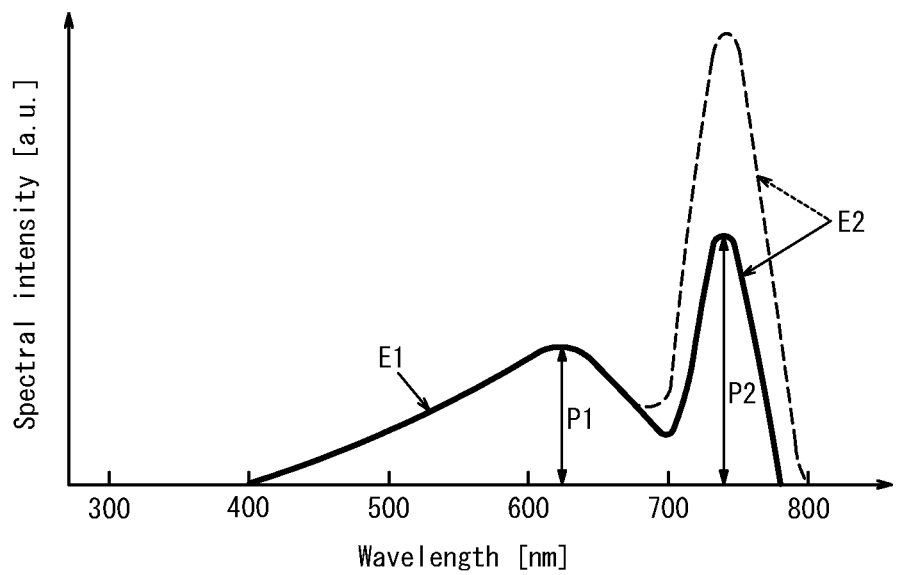
FIG. 5 schematically illustrates an example of the spectrum of irradiation light irradiated by the light source in FIG. 1.

FIG. 5 schematically illustrates an example of the spectrum of irradiation light irradiated by the light source 24 in FIG. 1. The procedure for calculating the correction coefficient α is mainly described below with reference to FIG. 5. In the following first procedure and second procedure for calculating the correction coefficient α, the controller 31 adjusts at least one of a first drive current and a second drive current so that the ratio between a first spectral intensity P1 at a first peak wavelength of the first spectrum E1 and a second spectral intensity P2 at a second peak wavelength of the second spectrum E2 becomes the same as the ratio between the spectral intensity A at the first peak wavelength and the spectral intensity B at the second peak wavelength in the emission spectrum of the lamp light source illustrated in FIG. 4.

The controller 31 uses any method to acquire, in advance, the spectral intensity A at the first peak wavelength and the spectral intensity B at the second peak wavelength in the emission spectrum of the lamp light source serving as a reference, for example, as measured by a different apparatus from the turbidimeter 1, such as an optical spectrum analyzer. In the first procedure for calculating the correction coefficient α, the controller 31 calculates the ratio B/A based on the acquired spectral intensities A, B.

In the second procedure for calculating the correction coefficient Ct, the controller 31 uses any method to acquire the first spectral intensity P1 and the second spectral intensity P2, for example, as measured by an optical spectrum analyzer or the like while the first LED light source D1 and the second LED light source D2 simultaneously emit light. At this time, the controller 31 can separately adjust the first drive current of the first LED light source D1 and the second drive current of the second LED light source D2. The controller 31 adjusts the second drive current of the second LED light source D2, for example, to determine a drive current such that the second spectral intensity P2 satisfies Equation 5 below.

$$P2 = \frac{B}{A} \times P1 \quad \text{(Equation 5)}$$

The controller 31 stores a first drive current C1 of the first LED light source D1 and a second drive current C2 of the second LED light source D2 at this time in the storage 32.

In the above example, the controller 31 has been described as adjusting only the second drive current of the second LED light source D2 so that the ratio between the first spectral intensity P1 and the second spectral intensity P2 becomes the same as the ratio between the spectral intensity A and the spectral intensity B. At this time, the controller 31 may also optionally adjust the first drive current of the first LED light source D1, for example, so that the first spectral intensity P1 matches the spectral intensity A.

When the first drive current is adjusted, the absolute values of the first spectral intensity P1 and the second spectral intensity P2 match the corresponding spectral intensities in the emission spectrum of a lamp light source. Accordingly, a similar detection circuit to that of a known turbidimeter using a lamp light source can also be used in the turbidimeter 1 according to an embodiment. This improves the compatibility between a known turbidimeter and the turbidimeter 1 according to an embodiment.

When the first drive current is not adjusted, the first spectrum intensity P1 normally does not match the spectral intensity A. In this case as well, the controller 31 can perform a ratio calculation such as $I_S/I_T$ so that the effect of the difference between the absolute value of the emission spectrum of the light source 24 and the absolute value of the emission spectrum of the lamp light source cancels out between the denominator and the numerator. Even when the absolute values differ, the turbidities measured in each case therefore sufficiently correspond.

In the third procedure for calculating the correction coefficient α, the controller 31 individually adjusts the first drive current of the first LED light source D1 and the second drive current of the second LED light source D2 under factory conditions with a constant ambient environment, such as temperature and humidity, to achieve the same ratio as the ratio between the first drive current C1 and the second drive current C2 stored in the storage 32. At this time, the adjusted first drive current and second drive current may be the same values as the first drive current C1 and the second drive current C2 respectively or may be different values from the first drive current C1 and the second drive current C2 as long as the drive current and the emission intensity of each LED light source is in a range exhibiting linearity.

The controller 31 individually causes the first LED light source D1 and the second LED light source D2 to emit light at different timings, based on the adjusted first drive current and the second drive current, towards the liquid tank 27 filled with a liquid having 0 degree turbidity. The controller 31 stores a first detection signal intensity $I_{T1b}$ of the first transmitted light T1 and a second detection signal intensity $I_{T2b}$ of the second transmitted light T2, when the first LED light source D1 and the second LED light source D2 are caused to emit light, in the storage 32.

In the fourth procedure for calculating the correction coefficient α, the controller 31 individually causes the first LED light source D1 and the second LED light source D2 attached to the turbidimeter 1 to emit light at different timings at any first drive current and second drive current in conjunction with actual usage conditions by the user, for example. At this time, the liquid tank 27 is filled with a liquid having 0 degree turbidity. The controller 31 stores a first detection signal intensity $I_{T1i}$ of the first transmitted light T1 and a second detection signal intensity $I_{T2i}$ of the second transmitted light T2, when the first LED light source D1 and the second LED light source D2 are caused to emit light, in the storage 32.

The controller 31 calculates the correction coefficient α using Equation 6 below.

$$\alpha = \frac{I_{T2b} \cdot I_{T1i}}{I_{T1b} \cdot I_{T2i}} \quad \text{(Equation 6)}$$

The controller 31 stores the correction coefficient α calculated as described above in the storage 32. The controller 31 alternately operates one of the first LED light source D1 and the second LED light source D2 at the aforementioned first drive current and second drive current set in conjunction with actual usage conditions by the user. As a result, the controller 31 can use the correction coefficient α stored in advance in the storage 32 to calculate the turbidity N of the liquid to be measured based on Equation 4. At this time, the turbidimeter 1 need not be provided with a function for adjusting each drive current. The correction coefficient α is calculated at the initial calibration stage before product shipment, as described above, and may be updated regularly thereafter by the user or the like.

As a result of the above processing by the controller 31, at least one of the first detection signal intensity and the second detection signal intensity is corrected, and the turbidity of the liquid to be measured as calculated by the controller 31 corresponds to the turbidity measured using a lamp light source.

A second example correction method is described below.

Instead of the above-described first example correction method, the turbidimeter 1 may, for example, perform turbidity measurement with the emission spectrum having been corrected optically based on the drive current of the LED light source.

In the second example correction method, the first parameter related to turbidity calculation includes the first drive current of the first LED light source D1, and the second parameter related to turbidity calculation includes the second drive current of the second LED light source D2. At this time, the controller 31 corrects at least one of the first drive current and the second drive current so that the turbidity calculated by the controller 31 corresponds to the turbidity of the liquid to be measured as measured using a lamp light source.

In greater detail, the controller 31 corrects at least one of the first drive current and the second drive current so that the ratio between the first spectral intensity P1 at the first peak wavelength of the first spectrum E1 and the second spectral intensity P2 at the second peak wavelength of the second spectrum E2 illustrated in FIG. 5 becomes the same as the ratio between the spectral intensity A at the first peak wavelength and the spectral intensity B at the second peak wavelength in the emission spectrum of the lamp light source illustrated in FIG. 4.

Specifically, the controller 31 uses exactly the same procedures as the first procedure and the second procedure for calculating the correction coefficient α described in the first example correction method to store the first drive current C1 of the first LED light source D1 and the second drive current C2 of the second LED light source D2 in the storage 32.

For example, the controller 31 causes the first LED light source D1 and the second LED light source D2 to emit light at the first drive current C1 and the second drive current C2 stored in the storage 32 and calculates the turbidity of the liquid to be measured. At this time, the controller 31 may calculate the turbidity N based on Equation 7 below, for example, yielded by substituting 1 for the correction coefficient α in Equation 4.

$$N = K\left(\frac{I_{S1} + I_{S2}}{I_{T1} + I_{T2}} - \frac{I_{S1(0)} + I_{S2(0)}}{I_{T1(0)} + I_{T2(0)}}\right) \quad \text{(Equation 7)}$$

In other words, the controller 31 may individually cause the first LED light source D1 and the second LED light source D2 to emit light at different timings based on the first drive current C1 and the second drive current C2 respectively and then calculate the turbidity N. This example is not limiting. The controller 31 may cause the first LED light source D1 and the second LED light source D2 to emit light simultaneously based on the first drive current C1 and the second drive current C2 and then calculate the turbidity N. At this time, the controller 31 may, for example, use Equation 3 in the same manner as for known turbidity calculation using a lamp light source and then calculate the turbidity N from the ratio $I_S/I_T$ between the detection signal intensities of the transmitted light T and the scattered light S based on the irradiation light.

By thus causing the first LED light source D1 and the second LED light source D2 to emit light with different drive currents using the first drive current C1 and the second drive current C2, the controller 31 can correct the emission spectrum of the light source 24 to sufficiently correspond to the emission spectrum of a lamp light source.

When the first irradiation light L1 and the second irradiation light L2 are irradiated simultaneously from the light source 24, the entire spectrum of irradiation light has a continuously changing spectral intensity yielded by the combination of the first spectrum E1 and the second spectrum E2, unlike a white LED or a dimmable/mixed color LED having a plurality of discontinuous peaks in the visible region.

The above configuration of the light source 24 achieves good compatibility between the emission spectrum of the light source 24 and the emission spectrum of a known lamp light source. Consequently, during turbidity measurement using LEDs, the intensity of transmitted light T transmitted through the liquid to be measured and scattered light S scattered by the liquid to be measured sufficiently correspond, in a predetermined wavelength region, to the light intensity when using a known lamp light source. The turbidity of the liquid to be measured therefore sufficiently corresponds when performing measurement using either light source.

Figure 6:
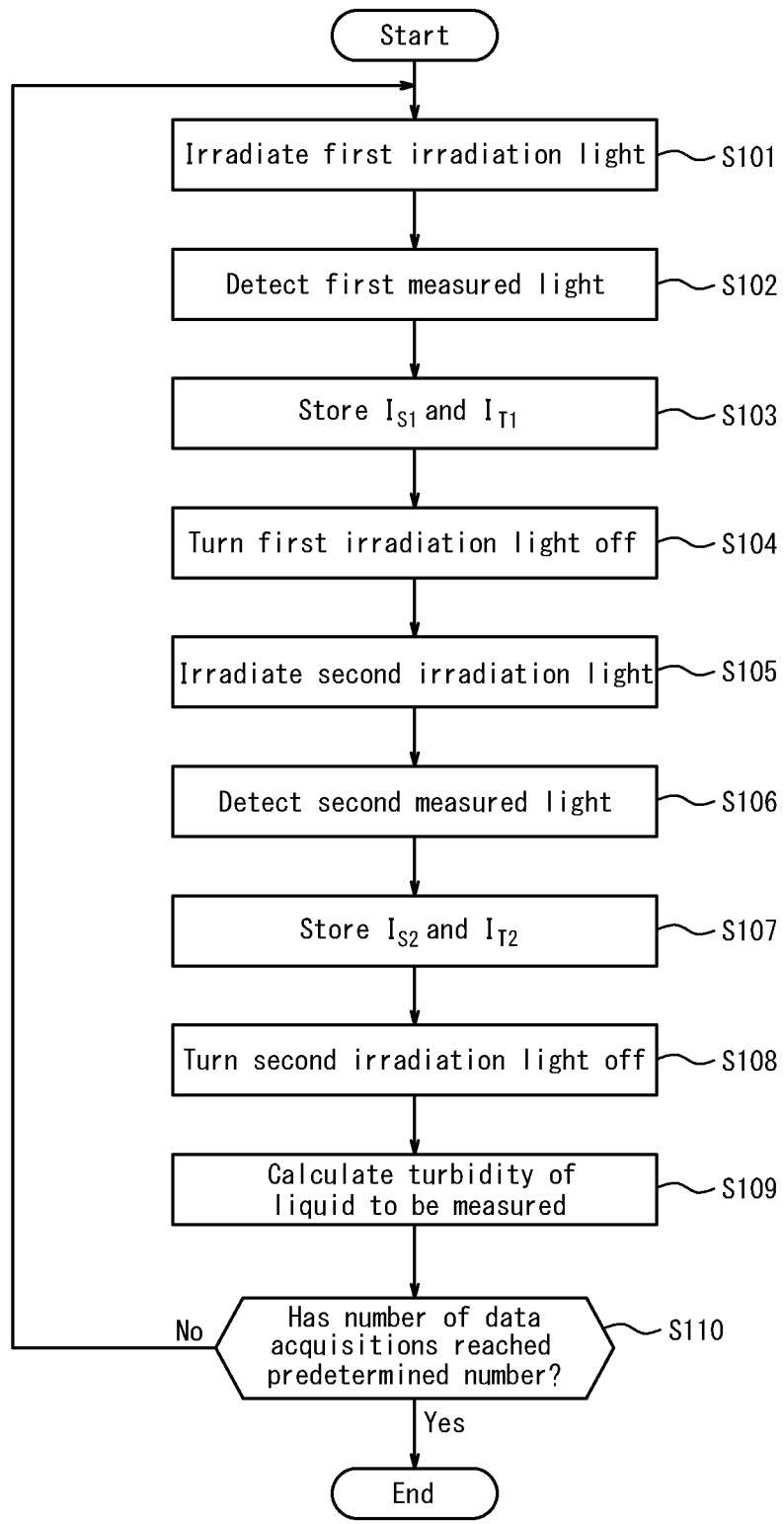
FIG. 6 is a flowchart illustrating an example of a turbidity measurement method using the turbidimeter of FIG. 1.

FIG. 6 is a flowchart illustrating an example of a turbidity measurement method using the turbidimeter 1 of FIG. 1. An example of the processing flow executed by the controller 31 of the turbidimeter 1 according to an embodiment to measure the turbidity of the liquid to be measured is mainly described with reference to FIG. 6.

In step S101, the controller 31 turns on the first LED light source D1 to irradiate the first irradiation light L1 having the first spectrum E1 towards the liquid to be measured.

In step S102, the controller 31 detects the first measured light ML1 based on the first irradiation light L1 irradiated towards the liquid to be measured in step S101.

In step S103, the controller 31 stores the first detection signal intensity $I_{S1}$ of the first scattered light S1 and the first detection signal intensity $I_{T1}$ of the first transmitted light T1 in the storage 32 based on the first measured light ML1 detected in step S102.

In step S104, the controller 31 turns off the first LED light source D1 to turn off the first irradiation light L1.

In step S105, the controller 31 turns on the second LED light source D2 to irradiate the second irradiation light L2 having the second spectrum E2 that differs from the first spectrum E1 towards the liquid to be measured.

In step S106, the controller 31 detects the second measured light ML2 based on the second irradiation light L2 irradiated towards the liquid to be measured in step S105.

In step S107, the controller 31 stores the second detection signal intensity $I_{S2}$ of the second scattered light S2 and the second detection signal intensity $I_{T2}$ of the second transmitted light T2 in the storage 32 based on the second measured light ML2 detected in step S106.

In step S108, the controller 31 turns off the second LED light source D2 to turn off the second irradiation light L2.

In step S109, the controller 31 calculates the turbidity N of the liquid to be measured using Equation 4 or the like, for example, based on $I_{S1}$ and $I_{T1}$ stored in the storage 32 in step S103 and $I_{S2}$ and $I_{T2}$ stored in the storage 32 in step S107.

In step S110, the controller 31 judges whether the number of data acquisitions has reached a predetermined value set by the user using the input interface 33, for example. The controller 31 repeats the processing from step S101 to step S109 when judging that the number of data acquisitions has not reached the predetermined number. The controller 31 ends the processing when judging that the number of data acquisitions has reached the predetermined number.

When using the above-described first correction method, the controller 31 calculates the correction coefficient α before step S101 of FIG. 6, for example, and stores the correction coefficient α in the storage 32. When calculating the turbidity N of the liquid to be measured in step S109, the controller 31 corrects at least one of the first detection signal intensity and the second detection signal intensity based on the correction coefficient α stored in advance in the storage 32.

When using the above-described second correction method, the controller 31 determines the first drive current C1 and the second drive current C2 before step S101 of FIG. 6, for example, and corrects at least one of the corresponding first drive current and second drive current.

In the processing flow illustrated in FIG. 6, the cycle from step S101 to step S109 is, for example, approximately 1 to 2 seconds. The controller 31 may average the turbidity N calculated each time in step S109 over a plurality of cycles.

In the turbidimeter 1 according to an embodiment, the controller 31 corrects at least one of the first parameter related to turbidity calculation associated with the first irradiation light L1 and the second parameter related to turbidity calculation associated with the second irradiation light L2 so that the turbidity calculated by the controller 31 corresponds to the turbidity of the liquid to be measured as measured using another light source serving as a standard of comparison. The above-described turbidimeter 1 according to an embodiment is capable of calculating the turbidity of a liquid to be measured so as to match the turbidity of the liquid to be measured as measured by a known turbidimeter using another light source. Accordingly, when a user changes a measurement apparatus for turbidity measurement of a liquid to be measured from a known turbidimeter that uses a lamp light source, for example, to the turbidimeter 1 according to an embodiment that uses an LED light source, the user can obtain a similar measurement result for the same liquid to be measured. This is more convenient for a user when updating the measurement apparatus to the turbidimeter 1 according to an embodiment.

It will be clear to a person of ordinary skill in the art that the present disclosure may be implemented in certain ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are considered to be included therein.

For example, the shape, arrangement, orientation, number, and the like of the above-described components are not limited to the above explanation or the drawings. The shape, arrangement, orientation, number, and the like of each component may be selected freely as long as the functions of the component can be achieved.

For example, the steps in the measurement method using the above-described turbidimeter 1 and the functions and the like included in each step may be rearranged in any logically consistent way. The order of steps may be changed, steps may be combined, and individual steps may be divided.

For example, the present disclosure may also be embodied as a program containing a description of the processing for achieving the functions of the above-described turbidimeter 1 or a recording medium with the program recorded thereon. Such embodiments are also to be understood as falling within the scope of the present disclosure.

In the first example correction method, the controller 31 has been described as irradiating one of the first irradiation light L1 and the second irradiation light L2 alternately, but the controller 31 is not limited to this control method. For example, as long as the controller 31 is able to calculate each of the above-described detection signal intensities individually based on the first irradiation light L1 and the second irradiation light L2, the controller 31 may irradiate the first irradiation light L1 and the second irradiation light L2 simultaneously. At this time as well, the controller 31 may calculate the turbidity N using the above-described Equation 4.

Figure 7:
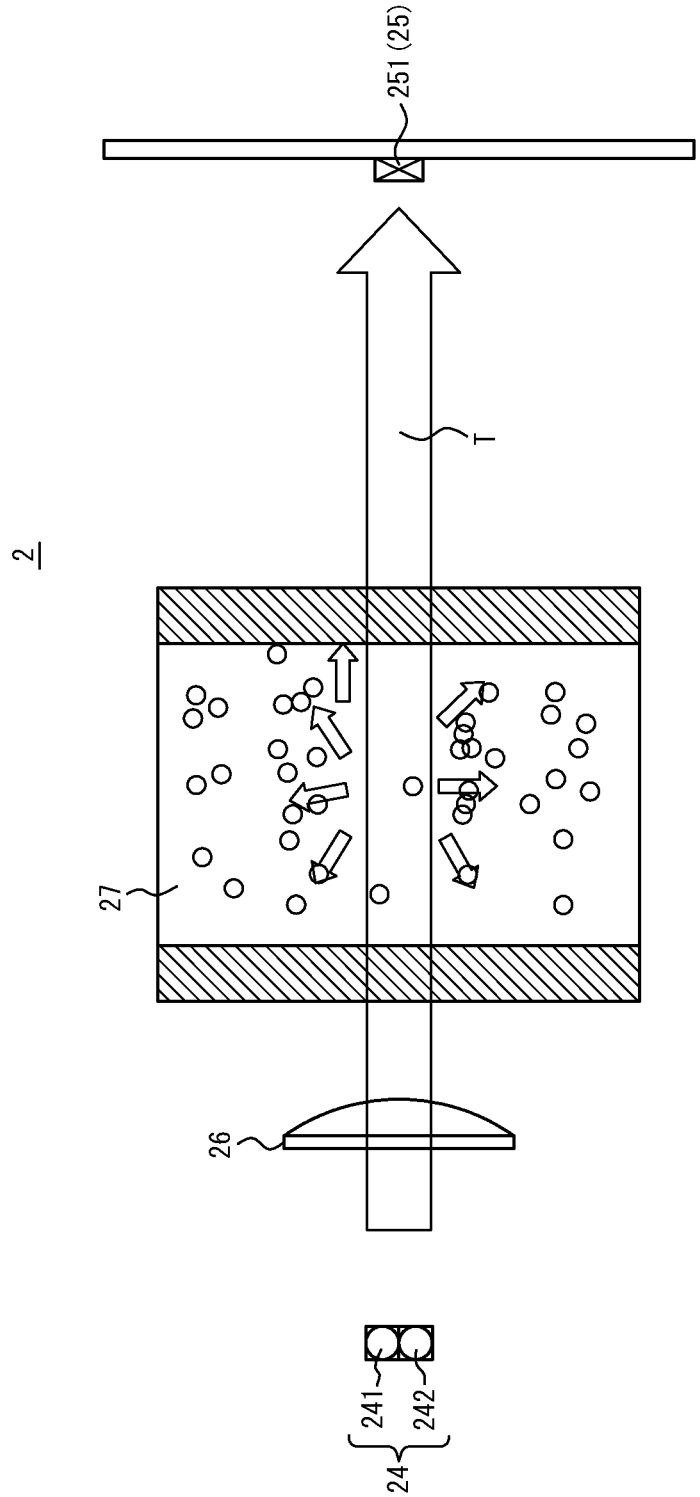
FIG. 7 is a schematic diagram, corresponding to FIG. 3, illustrating a first modification to a turbidimeter according to an embodiment.
Figure 8:
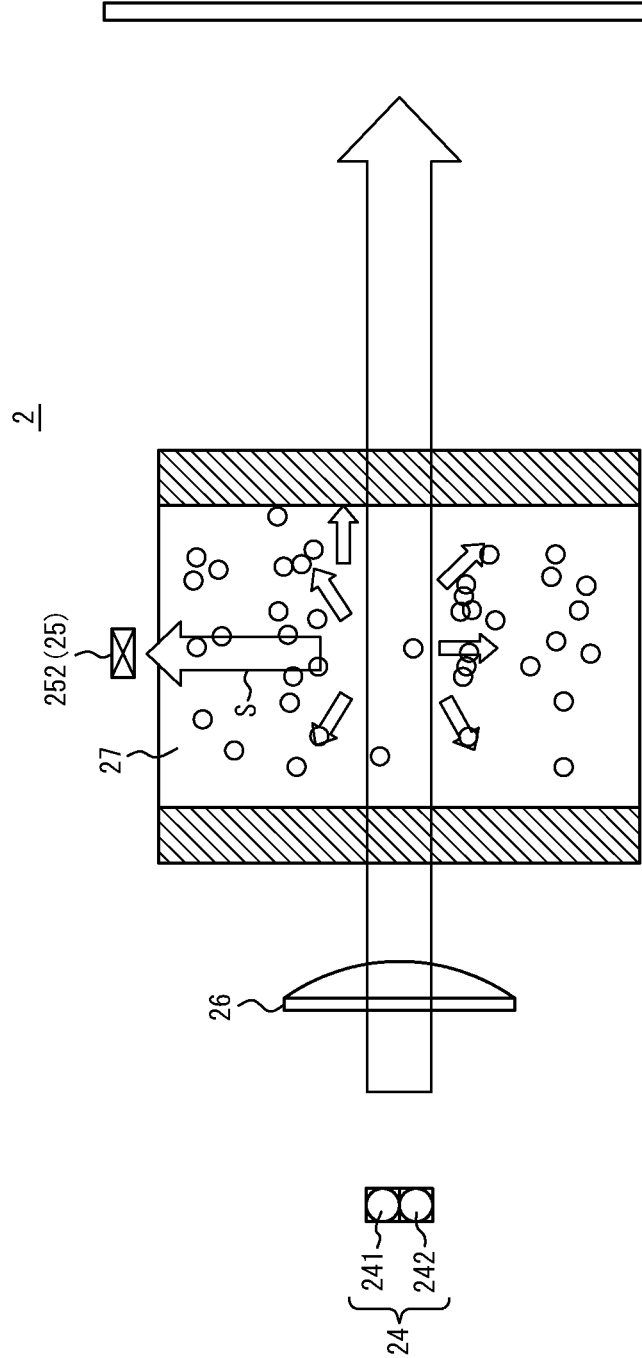
FIG. 8 is a schematic diagram, corresponding to FIG. 3, illustrating a second modification to a turbidimeter according to an embodiment.
Figure 9:
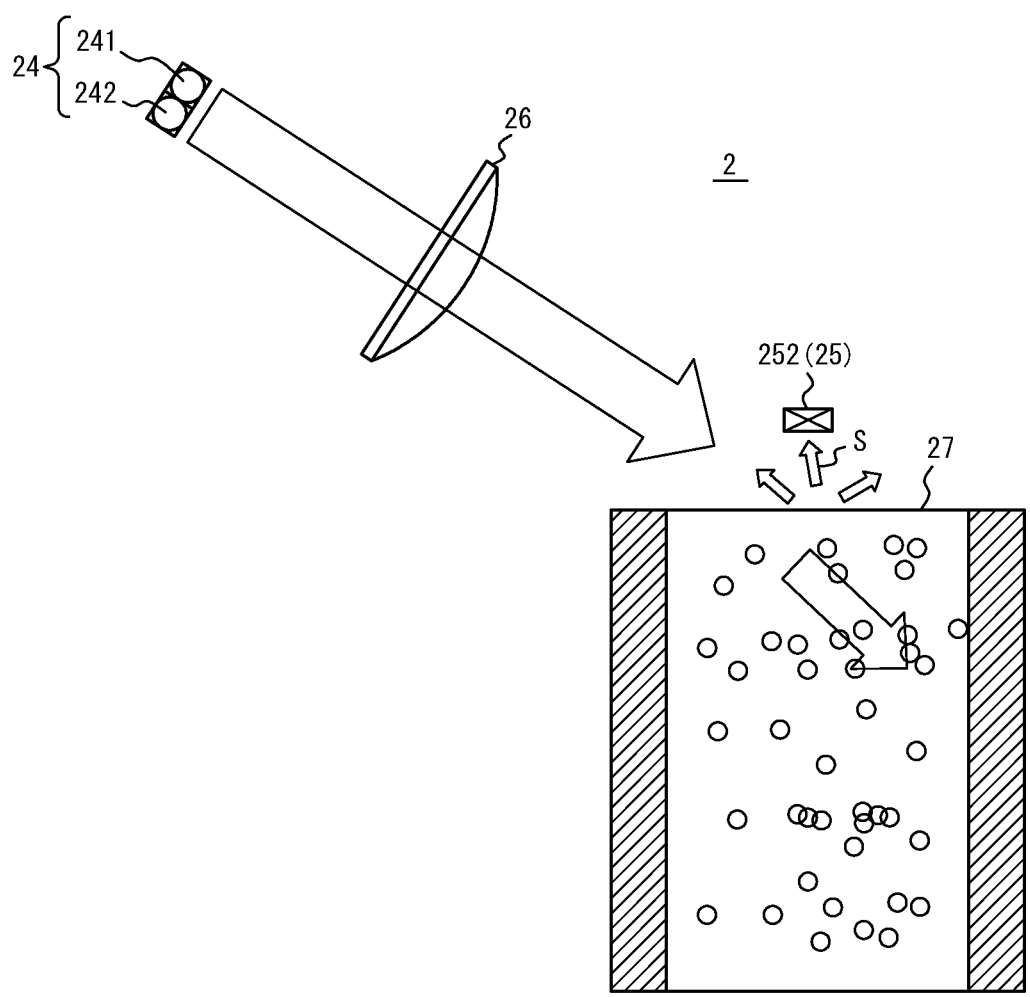
FIG. 9 is a schematic diagram, corresponding to FIG. 3, illustrating a third modification to a turbidimeter according to an embodiment.

The turbidimeter 1 has been described as being based on a transmitted/scattered light comparison method, as illustrated in FIG. 3, but this example is not limiting. FIG. 7 is a schematic diagram, corresponding to FIG. 3, illustrating a first modification to the turbidimeter 1 according to an embodiment. As illustrated in FIG. 7, the turbidimeter 1 may be a based on a transmitted light method for measuring turbidity using only absorbance. FIG. 8 is a schematic diagram, corresponding to FIG. 3, illustrating a second modification to the turbidimeter 1 according to an embodiment. As illustrated in FIG. 8, the turbidimeter 1 may be based on a scattered light method. FIG. 9 is a schematic diagram, corresponding to FIG. 3, illustrating a third modification to the turbidimeter 1 according to an embodiment. As illustrated in FIG. 9, the turbidimeter 1 may be based on a surface scattered light method.

The second LED light source D2 has been described as having only one monochromatic LED that emits light in the near-infrared region, but this example is not limiting. The light source 24 may include a plurality of monochromatic LEDs having different emission wavelengths in the region in which the spectral intensity of the first spectrum E1 is reduced, so that the spectrum of the irradiation light irradiated from the light source 24 becomes closer to the emission spectrum of a lamp light source.

For example, the light source 24 may further include a third light source 243 that irradiates third irradiation light L3, having a third spectrum E3, towards the liquid to be measured. The third light source 243 includes any light source capable of irradiating the third irradiation light L3. For example, the third light source 243 includes a third LED light source D3. The third LED light source D3 may include one monochromatic LED that emits light in the near-infrared region.

At this time, the controller 31 may cause the first LED light source D1, the second LED light source D2, and the third LED light source D3 to operate at different timings to irradiate the first irradiation light L1, the second irradiation light L2, and the third irradiation light L3 at different timings. The light receiver 25 further acquires a detection signal of third measured light ML3 based on the third irradiation light L3 irradiated towards the liquid to be measured.

The controller 31 corrects the first parameter related to turbidity calculation associated with the first irradiation light L1, the second parameter related to turbidity calculation associated with the second irradiation light L2, and a third parameter related to turbidity calculation associated with the third irradiation light L3 using a similar method to the above-described first and second example correction methods. The controller 31 calculates the turbidity of the liquid to be measured based on the detection signals of the first measured light ML1, the second measured light ML2, and the third measured light ML3. Here, in the first example correction method, the third parameter related to turbidity calculation includes a third detection signal intensity of the third measured light ML3 detected by the light receiver 25. In the second example correction method, the third parameter related to turbidity calculation includes a third drive current of the third LED light source D3.

For example, the first example correction method is described for the case of using three light sources. The third detection signal intensity of the third scattered light S3 is designated as $I_{S3}$, and the third detection signal intensity of the third transmitted light T3 is designated as $I_{T3}$, where $I_{S3}$ and $I_{T3}$ are obtained when only the third irradiation light L3 is irradiated towards the liquid to be measured. At this time, the controller 31 calculates the turbidity N using Equation 8 below instead of Equation 4.

$$N = K\left(\frac{\alpha_1 I_{S1} + \alpha_2 I_{S2} + \alpha_3 I_{S3}}{\alpha_1 I_{T1} + \alpha_2 I_{T2} + \alpha_3 I_{T3}} - \frac{\alpha_1 I_{S1(0)} + \alpha_2 I_{S2(0)} + \alpha_3 I_{S3(0)}}{\alpha_1 I_{T1(0)} + \alpha_2 I_{T2(0)} + \alpha_3 I_{T3(0)}}\right) \quad \text{(Equation 8)}$$

In Equation 8, $I_{S3(0)}$ indicates the third detection signal intensity of the third scattered light S3 obtained when only the third irradiation light L3 is irradiated towards a liquid with 0 degree turbidity. $I_{T3(0)}$ indicates the third detection signal intensity of the third transmitted light T3 obtained when only the third irradiation light L3 is irradiated towards a liquid with 0 degree turbidity.

Furthermore, $\alpha_1$, $\alpha_2$, and $\alpha_3$ are correction coefficients for bringing the rate at which the first LED light source D1, the second LED light source D2, and the third LED light source D3 contribute to turbidity measurement closer to a known lamp light source. The correction coefficients $\alpha_1$, $\alpha_2$, and $\alpha_3$ are calculated by a method similar to the calculation method based on the procedure for calculating the correction coefficient $\alpha$ described above in the first example correction method. The correction coefficients $\alpha_1$, $\alpha_2$, and $\alpha_3$ are calculated based on a spectral intensity comparison of a pair of two light sources among the three light sources. The controller 31 sets one of the correction coefficients $\alpha_1$, $\alpha_2$, and $\alpha_3$ to 1 and takes the emission intensity of the corresponding light source as a reference to be paired off with the other two light sources. For example, when setting $\alpha_1$ to 1, the controller 31 designates the first LED light source D1 and the second LED light source D2 as a pair. The controller 31 calculates the correction coefficient $\alpha_2$ based on the spectral intensity ratio of these light sources. Similarly, when setting $\alpha_1$ to 1, the controller 31 designates the first LED light source D1 and the third LED light source D3 as a pair. The controller 31 calculates the correction coefficient $\alpha_3$ based on the spectral intensity ratio of these light sources.

The scattered light S detected by the transmitted light detector 251 has been considered sufficiently weak relative to the transmitted light T, and the contribution of the scattered light S to the term representing the detection signal intensity related to the transmitted light T has been ignored, as in Equation 4. The method of calculating the turbidity N is not, however, limited to this example. The controller 31 may, for example, calculate the turbidity N by including the contribution of the scattered light S in the term representing the detection signal intensity related to the transmitted light T, as in Equation 9 below.

$$N = K\left\{\frac{I_{S1} + \alpha I_{S2}}{I_{T1} + \alpha I_{T2} + \beta(I_{S2} + \alpha I_{S2})} - \frac{I_{S1(0)} + \alpha I_{S2(0)}}{I_{T1(0)} + \alpha I_{T2(0)} + \beta(I_{S1(0)} + \alpha I_{S2(0)})}\right\} \quad \text{(Equation 9)}$$

In Equation 9, $\beta$ is a constant determined by the shape and characteristics of the detector. Equation 9 indicates that the component due to scattered light S is added to the detection signal intensity related to the transmitted light T in proportion to the constant $\beta$. Adding a portion of the detection signal intensity of the scattered light S to the detection signal intensity of the transmitted light T at a predetermined ratio in the turbidimeter allows good linearity to be obtained. In this turbidimeter as well, Equation 9 allows a lamp light source to be replaced by two or more LED light sources. Good linearity can be obtained in a wide range, from low to high turbidity, by the controller 31 calculating the turbidity N using Equation 9, even when a plurality of LED light sources are used. The transmitted light T and the scattered light S change in different ways in a low turbidity region and a high turbidity region. Conventionally, optimal linearity has therefore been achieved in each region by adjusting the optical system. By the controller 31 calculating the turbidity N using Equation 9, however, good linearity can be obtained in a wide range, from low turbidity to high turbidity, with the same optical system.

The invention claimed is:

1. A turbidity measurement method for measuring turbidity of a liquid to be measured, the turbidity measurement method comprising:
   irradiating a first irradiation light having a first spectrum towards the liquid to be measured using a first LED light source;
   acquiring a detection signal of first measured light based on the first irradiation light irradiated towards the liquid to be measured;
   irradiating a second irradiation light having a second spectrum different from the first spectrum towards the liquid to be measured using a second LED light source;
   acquiring a detection signal of second measured light based on the second irradiation light irradiated towards the liquid to be measured;
   calculating turbidity of the liquid to be measured based on the detection signal of the first measured light and the detection signal of the second measured light;
   acquiring information related to an emission spectrum of another lamp light source different from the first LED light source and the second LED light source and serving as a standard of comparison; and
   correcting, based on the information related to the emission spectrum, at least one of a first parameter related to turbidity calculation associated with the first irradiation light and a second parameter related to turbidity calculation associated with the second irradiation light so that the turbidity calculated in the calculating turbidity of the liquid to be measured corresponds to a turbidity of the liquid to be measured as measured using the lamp light source.

2. The turbidity measurement method of claim 1,
wherein the first parameter related to turbidity calculation comprises a first detection signal intensity of the first measured light;
wherein the second parameter related to turbidity calculation comprises a second detection signal intensity of the second measured light; and
wherein in the correcting, at least one of the first detection signal intensity and the second detection signal intensity is corrected.

3. The turbidity measurement method of claim 2, wherein the irradiating the first irradiation light towards the liquid to be measured and the irradiating the second irradiation light towards the liquid to be measured are performed at different timings.

4. The turbidity measurement method of claim 2, wherein the first measured light and the second measured light each comprise transmitted light that is transmitted by the liquid to be measured and scattered light that is scattered by the liquid to be measured.

5. The turbidity measurement method of claim 4, wherein in the calculating turbidity of the liquid to be measured, the first detection signal intensity of first scattered light included in the first measured light is designated as Isi, the first detection signal intensity of first transmitted light included in the first measured light is designated as $I_{T1}$, the second detection signal intensity of second scattered light included in the second measured light is designated as $I_{S2}$, the second detection signal intensity of second transmitted light included in the second measured light is designated as $I_{T2}$, the turbidity is designated as N, and N is calculated as $$N = K\left(\frac{I_{S1} + \alpha I_{S2}}{I_{T1} + \alpha I_{T2}} - \frac{I_{S1(0)} + \alpha I_{S2(0)}}{I_{T1(0)} + \alpha I_{T2(0)}}\right)$$

where K is a sensitivity coefficient for turbidity calculation, $I_{S1(0)}$ is the first detection signal intensity of the first scattered light obtained for a liquid with 0 degree turbidity, $I_{T1(0)}$ is the first detection signal intensity of the first transmitted light obtained for a liquid with 0 degree turbidity, $I_{S2(0)}$ is the second detection signal intensity of the second scattered light obtained for a liquid with 0 degree turbidity, $I_{T2(0)}$ is the second detection signal intensity of the second transmitted light obtained for a liquid with 0 degree turbidity, and a is a correction coefficient.

6. The turbidity measurement method of claim 1,
wherein the first parameter related to turbidity calculation comprises a first drive current of the first LED light source that irradiates the first irradiation light;
wherein the second parameter related to turbidity calculation comprises a second drive current of the second LED light source that irradiates the second irradiation light; and
wherein in the correcting, at least one of the first drive current and the second drive current is corrected.

7. The turbidity measurement method of claim 1, further comprising:
irradiating a third irradiation light having a third spectrum towards the liquid to be measured using a third LED light source; and
acquiring a detection signal of third measured light based on the third irradiation light irradiated towards the liquid to be measured;
wherein in the calculating turbidity of the liquid to be measured, the turbidity of the liquid to be measured is calculated based on the detection signal of the first measured light, the detection signal of the second measured light, and the detection signal of the third measured light; and
wherein in the correcting, the first parameter related to turbidity calculation associated with the first irradiation light, the second parameter related to turbidity calculation associated with the second irradiation light, and a third parameter related to turbidity calculation associated with the third irradiation light are corrected.

8. A turbidimeter for measuring turbidity of a liquid to be measured, the turbidimeter comprising:
a first LED light source configured to irradiate a first irradiation light having a first spectrum towards the liquid to be measured;
a second LED light source configured to irradiate a second irradiation light having a second spectrum different from the first spectrum towards the liquid to be measured;
a light receiver configured to acquire a detection signal of first measured light based on the first irradiation light irradiated towards the liquid to be measured and a detection signal of second measured light based on the second irradiation light irradiated towards the liquid to be measured; and
a controller configured to calculate turbidity of the liquid to be measured based on the detection signal of the first measured light and the detection signal of the second measured light;
wherein the controller is configured to acquire information related to an emission spectrum of another lamp light source different from the first LED light source and the second LED light source and serving as a standard of comparison and correct, based on the information related to the emission spectrum, at least one of a first parameter related to turbidity calculation associated with the first irradiation light and a second parameter related to turbidity calculation associated with the second irradiation light so that the turbidity calculated by the controller corresponds to a turbidity of the liquid to be measured as measured using the lamp light source.

9. The turbidimeter of claim 8,
wherein the first parameter related to turbidity calculation comprises a first detection signal intensity of the first measured light detected by the light detector;
wherein the second parameter related to turbidity calculation comprises a second detection signal intensity of the second measured light detected by the light detector; and
wherein the controller is configured to correct at least one of the first detection signal intensity and the second detection signal intensity.

10. The turbidimeter of claim 9, wherein the controller is configured to operate the first LED light source and the second LED light source at different timings to irradiate the first irradiation light and the second irradiation light at different timings.

11. The turbidimeter of claim 9, wherein the first measured light and the second measured light each comprise transmitted light that is transmitted by the liquid to be measured and scattered light that is scattered by the liquid to be measured.

12. The turbidimeter of claim 11, wherein the first detection signal intensity of first scattered light included in the first measured light is designated as $I_{S1}$, the first detection signal intensity of first transmitted light included in the first measured light is designated as $I_{T1}$, the second detection signal intensity of second scattered light included in the second measured light is designated as $I_{S2}$, the second detection signal intensity of second transmitted light included in the second measured light is designated as $I_{T2}$, the turbidity is designated as N, and the controller is configured to calculate N as $$N = K\left(\frac{I_{S1} + \alpha I_{S2}}{I_{T1} + \alpha I_{T2}} - \frac{I_{S1(0)} + \alpha I_{S2(0)}}{I_{T1(0)} + \alpha I_{T2(0)}}\right)$$

where K is a sensitivity coefficient for turbidity calculation, $I_{S1(0)}$ is the first detection signal intensity of the first scattered light obtained for a liquid with 0 degree turbidity, $I_{T1(0)}$ is the first detection signal intensity of the first transmitted light obtained for a liquid with 0 degree turbidity, $I_{S2(0)}$ is the second detection signal intensity of the second scattered light obtained for a liquid with 0 degree turbidity, Imo) is the second detection signal intensity of the second transmitted light obtained for a liquid with 0 degree turbidity, and a is a correction coefficient.

13. The turbidimeter of claim 8,
wherein the first parameter related to turbidity calculation comprises a first drive current of the first LED light source;
wherein the second parameter related to turbidity calculation comprises a second drive current of the second LED light source; and
wherein the controller is configured to correct at least one of the first drive current and the second drive current.

14. The turbidimeter of claim 8, further comprising:
a third LED light source configured to irradiate a third irradiation light having a third spectrum towards the liquid to be measured;
wherein the light receiver is configured to acquire a detection signal of third measured light based on the third irradiation light irradiated towards the liquid to be measured;
wherein the controller is configured to correct the first parameter related to turbidity calculation associated with the first irradiation light, the second parameter related to turbidity calculation associated with the second irradiation light, and a third parameter related to turbidity calculation associated with the third irradiation light; and
wherein the controller is configured to calculate the turbidity of the liquid to be measured based on the detection signal of the first measured light, the detection signal of the second measured light, and the detection signal of the third measured light.

* * * * *